United States Patent
Kato et al.

(10) Patent No.: US 7,739,001 B2
(45) Date of Patent: Jun. 15, 2010

(54) VEHICLE STEERING APPARATUS

(75) Inventors: Hiroaki Kato, Hekinan (JP); Shinji Takeuchi, Okazaki (JP)

(73) Assignee: JTEKT Corporation, Chuo-ku (JP)

( * ) Notice: Subject to any disclaimer, the term of this patent is extended or adjusted under 35 U.S.C. 154(b) by 1471 days.

(21) Appl. No.: 11/098,387

(22) Filed: Apr. 5, 2005

(65) Prior Publication Data
US 2005/0228564 A1 Oct. 13, 2005

(30) Foreign Application Priority Data
Apr. 9, 2004 (JP) .............................. 2004-115730

(51) Int. Cl.
G05D 1/00 (2006.01)
(52) U.S. Cl. .............................. 701/2; 701/41; 701/91; 180/415; 180/443; 180/446; 180/412; 180/422
(58) Field of Classification Search .................... 701/41, 701/91; 180/415, 443, 446, 412, 422, 6
See application file for complete search history.

(56) References Cited

U.S. PATENT DOCUMENTS

| 4,834,204 | A | * | 5/1989 | Ito et al. ..................... 180/415 |
| 5,774,819 | A | | 6/1998 | Yamamoto et al. |
| 6,883,637 | B2 | * | 4/2005 | Nishizaki et al. ............ 180/446 |
| 2002/0007239 | A1 | | 1/2002 | Matsumoto et al. |
| 2003/0106725 | A1 | * | 6/2003 | Irikura ....................... 180/6.26 |
| 2004/0021284 | A1 | * | 2/2004 | Nakatsu et al. ........ 280/93.513 |
| 2004/0079578 | A1 | * | 4/2004 | Kurishige et al. ........... 180/446 |
| 2004/0140148 | A1 | * | 7/2004 | Nishizaki et al. ............ 180/443 |
| 2004/0148078 | A1 | * | 7/2004 | Nakano et al. ................. 701/41 |
| 2004/0182637 | A1 | * | 9/2004 | Yamamori et al. .......... 180/421 |
| 2005/0017472 | A1 | * | 1/2005 | Kondo et al. ........... 280/93.513 |
| 2005/0021205 | A1 | * | 1/2005 | Niwa et al. .................... 701/37 |
| 2005/0045413 | A1 | * | 3/2005 | Shitamitsu et al. .......... 180/402 |
| 2005/0085986 | A1 | * | 4/2005 | Aizawa et al. ................. 701/73 |

FOREIGN PATENT DOCUMENTS

| EP | 1 362 765 A2 | 11/2003 |
| EP | 1 380 491 A2 | 1/2004 |
| EP | 1 522 484 A2 | 4/2005 |
| JP | 2002-254964 | 9/2002 |
| WO | WO 03/099636 A1 | 12/2003 |

OTHER PUBLICATIONS

U.S. Appl. No. 12/174,873, filed Jul. 17, 2008, Kato, et al.
U.S. Appl. No. 12/177,239, filed Jul. 22, 2008, Kato, et al.

* cited by examiner

Primary Examiner—Khoi Tran
Assistant Examiner—McDieunel Marc
(74) Attorney, Agent, or Firm—Oblon, Spivak, McClelland, Maier & Neustadt, L.L.P.

(57) ABSTRACT

A vehicle steering apparatus for improving steering feel when changing the angle of a steered wheel with a motor. An IFS torque compensation unit includes an oversteer IFS torque compensation gain calculation unit, which obtains a larger IFS torque compensation gain as a control target element increases during oversteer control. When an oversteer state occurs, the IFS torque compensation control unit outputs a corrected gain, which is based on the IFS torque compensation gain.

12 Claims, 13 Drawing Sheets

VEHICLE STEERING APPARATUS

CROSS-REFERENCE TO RELATED APPLICATIONS

This application is based upon and claims the benefit of priority from prior Japanese Patent Application No. 2004-115730, filed on Apr. 9, 2004, the entire contents of which are incorporated herein by reference. The present application was the result of a joint research agreement between Koyo Seiko Company, Ltd. and Toyoda Koki Kabushiki Kaisha, both Japanese Corporations at the time of invention.

BACKGROUND OF THE INVENTION

The present invention relates to a vehicle steering apparatus.

A steering control system, which controls the yaw moment of a vehicle by controlling the steering angle of steered wheels based on a vehicle model (vehicle motion model), has been proposed in recent years (refer to, for example, Japanese Laid-Open Patent Publication No. 2002-254964). The vehicle model is generated by modeling the relationship between vehicle-condition parameters, such as vehicle velocity and yaw rate, and motion states of the vehicle. An intelligent front steering (IFS) system is one example of such a steering control system.

The IFS system integrally executes electronic control associated with steered wheels, such as variable gear ratio control and power assist control, based on a plurality of vehicle-condition parameters. The variable gear ratio control changes the transmission ratio (gear ratio) of the steered wheels relative to the turning angle of the steering wheel. The power assist control applies an assist force to the steering system of the vehicle.

For example, the IFS system calculates target values (e.g., a target yaw rate) of vehicle-condition parameters based on the vehicle model. Based on the target values, the system determines the steering characteristic of the vehicle and calculates a control amount for the steered wheels. When the vehicle is in an understeer state, the system executes such control that reduces the turning angle of each steered wheel (understeer control). When the vehicle is in an oversteer state, the system executes such control that steers each steered wheel at an angle oriented in a direction opposite to the direction of the actual steering angle. That is, the system executes control for counter-steering (oversteer control). This stabilizes the behavior of the vehicle even under conditions where the behavior of the vehicle is likely to become unstable, such as on a low-friction road.

Such understeer control and oversteer control are executed by changing an ACT angle, which is a steering angle for the steered wheels produced by motor drive, by actuating a variable gear ratio actuator. Thus, the steering operation performed by the driver does not necessarily have a constant relationship with the movement of the steered wheels. The expected steering torque may differ from the actual steering torque. This may result in an uncomfortable steering feel.

SUMMARY OF THE INVENTION

It is an object of the present invention to provide a vehicle steering apparatus that reduces the difference between the expected steering feel and actual steering feel, which is caused by changing the steering angle through motor drive, and improves the steering feel.

One aspect of the present invention is a vehicle steering apparatus for changing a steering angle of a steered wheel of a vehicle in accordance with operation of a steering wheel. The steering apparatus is provided with a variable transmission ratio device including a motor for steering the steered wheel. The steering angle of the steered wheel is determined by superimposing a first steering angle, based on a turning angle of the steering wheel, and a second steering angle, based on drive of the motor. The variable transmission ratio device adjusts the second steering angle to change the ratio of the steering angle of the steered wheel relative to the turning angle of the steering wheel. A determination unit determines a steering characteristic of the vehicle. When the steering characteristic is oversteer, the variable transmission ratio device changes the second steering angle to move the steered wheel to a steering angle in a direction opposite to the present steering angle of the steered wheel with respect to a straight traveling direction of the vehicle. A steering force assist device generates an assist force in a direction counteracting a returning force to assist the operation of the steering wheel. The returning force acts on the steered wheel and is produced when the steering angle of the steered wheel changes. A control unit controls the steering force assist device. The control unit increases the assist force as the speed at which the second steering angle changes increases when the steering characteristic is oversteer.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A vehicle steering apparatus including a variable gear ratio system according to a preferred embodiment of the present invention will now be described with reference to the drawings.

Figure 1:
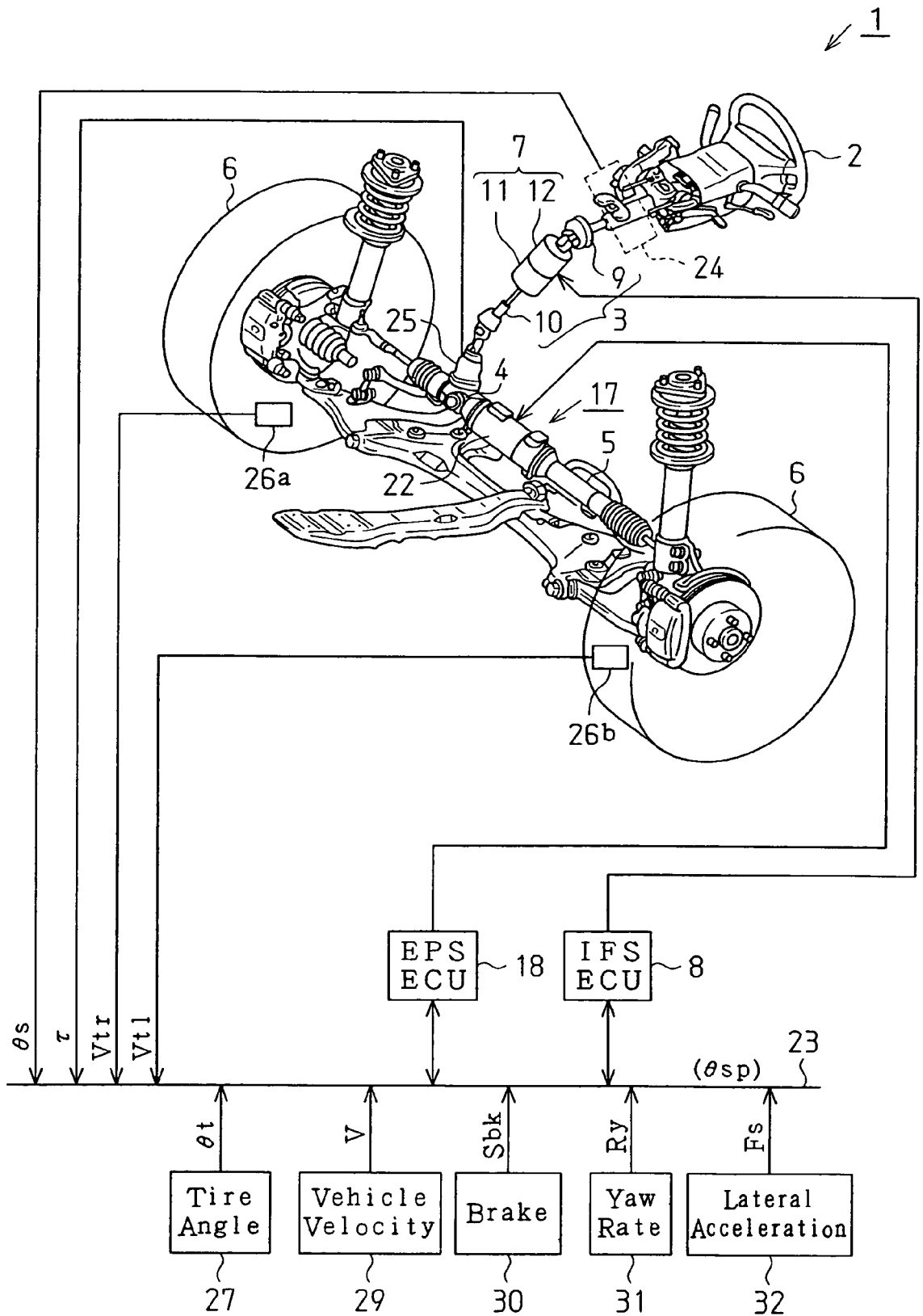
FIG. 1 is a schematic diagram showing the structure of a steering apparatus according to a preferred embodiment of the present invention.

FIG. 1 is a schematic diagram showing the structure of a steering apparatus 1 in the preferred embodiment. As shown in the drawing, a steering shaft 3, on which a steering wheel 2 is fixed, is linked to a rack 5 by a rack-and-pinion mechanism 4. The rack-and-pinion mechanism 4 converts the rotation of the steering shaft 3, which is produced through a steering operation, into linear reciprocating motion of the rack 5. The linear reciprocating motion of the rack 5 varies the steering angle, or tire angle, of each steered wheel 6 to change the travel direction of the vehicle.

The steering apparatus 1 of the preferred embodiment includes a variable gear ratio actuator 7 and a first ECU 8 (IFS ECU). The variable gear ratio actuator 7 functions as a variable transmission ratio device that varies the transmission ratio (gear ratio) of the steered wheels 6 relative to the turning angle of the steering wheel 2. The first ECU 8 controls actuation of the variable gear ratio actuator 7.

In detail, the steering shaft 3 includes a first shaft 9 and a second shaft 10. The steering wheel 2 is linked to the first shaft 9. The second shaft 10 is linked to the rack-and-pinion mechanism 4. The variable gear ratio actuator 7 includes a differential mechanism 11 and a motor 12. The differential mechanism 11 links the first shaft 9 and the second shaft 10. The motor 12 drives the differential mechanism 11. The variable gear ratio actuator 7 in the preferred embodiment employs harmonic drive for the differential mechanism 11. The variable gear ratio actuator 7 transmits rotation of the first shaft 9, which is produced by the steering operation and additionally by the motor 12, to the second shaft 10. In this way, the variable gear ratio actuator 7 accelerates (or decelerates) the rotation of the steering shaft 3 that is transmitted to the rack-and-pinion mechanism 4.

Figure 2:
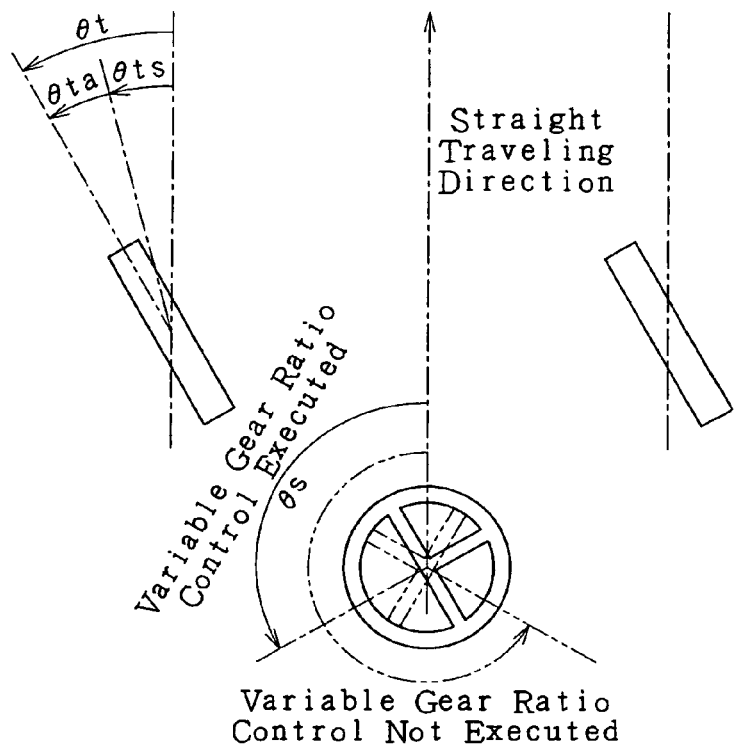
FIG. 2 is an explanatory diagram of variable gear ratio control executed in the steering apparatus of FIG. 1.
Figure 3:
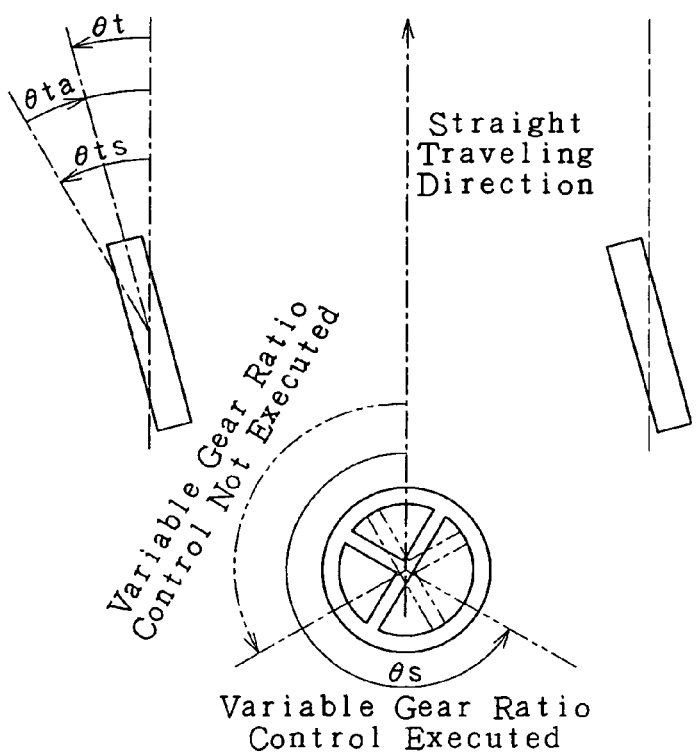
FIG. 3 is an explanatory diagram of the variable gear ratio control executed in the steering apparatus of FIG. 1.

Referring to FIGS. 2 and 3, the variable gear ratio actuator 7 adds a steering angle of the steered wheels 6 that is produced by motor drive (ACT angle $\theta$ta) to a steering angle of the steered wheels 6 (steering angle $\theta$ts) that is produced by the steering operation. In this way, the variable gear ratio actuator 7 varies the gear ratio of the steered wheels 6 relative to a steering angle $\theta$s. The first ECU 8 controls the variable gear ratio actuator 7 by controlling actuation of the motor 12. Thus, the first ECU 8 varies the gear ratio by controlling the ACT angle $\theta$ta (variable gear ratio control).

In this case, "adding" also includes subtracting. When expressing the gear ratio of the steered wheels 6 relative to the steering angle $\theta$s with an overall gear ratio ($\theta$s/$\theta$t, where $\theta$t is a tire angle), the overall gear ratio is small when the ACT angle $\theta$ta in the same direction as the steering angle $\theta$ts is added (refer to FIG. 2 in which the tire angle $\theta$t is large). The overall gear ratio is large when the ACT angle $\theta$ta in the opposite direction is added to the steering angle $\theta$ts (refer to FIG. 3 in which the tire angle $\theta$t is small). In the preferred embodiment, the steering angle $\theta$ts corresponds to a first steering angle, and the ACT angle $\theta$ta corresponds to a second steering angle.

Further, as shown in FIG. 1, the steering apparatus 1 includes an electric power steering (EPS) actuator 17 and a second ECU 18 (EPS ECU). The EPS actuator 17 applies an assist force to the steering system to assist the steering operation performed by the driver. The second ECU 18 functions as a control unit for controlling operation of the EPS actuator 17.

The EPS actuator 17 in the preferred embodiment is a rack-type EPS actuator, in which a motor 22 and the rack 5 are arranged coaxially. The motor 22 functions as a driving source for the EPS actuator 17. An assist torque generated by the motor 22 is transmitted to the rack 5 via a ball screw mechanism (not shown). The second ECU 18 controls the assist torque generated by the motor 22 to control the assist force applied to the steering system (power assist control).

In the preferred embodiment, the first ECU 8 for controlling the variable gear ratio actuator 7 and the second ECU 18 for controlling the EPS actuator 17 are connected to each other via an in-vehicle network 23, or controller area network (CAN). A plurality of sensors for detecting vehicle-condition parameters are connected to the in-vehicle network 23. More specifically, a steering angle sensor 24, a torque sensor 25, wheel velocity sensors 26a and 26b, a tire angle sensor 27, a vehicle velocity sensor 29, a brake sensor 30, a yaw rate sensor 31, and a lateral acceleration (lateral G-force) sensor 32 are connected to the in-vehicle network 23. In the preferred embodiment, the torque sensor 25 is arranged at the basal end of the second shaft 10. A plurality of vehicle-condition parameters detected by these sensors, namely, a steering angle $\theta$s, a steering torque $\tau$, wheel velocities Vtr and Vtl, a tire angle $\theta$t, a vehicle velocity V, a brake signal Sbk, a yaw rate Ry, and a lateral acceleration Fs, are input into the first ECU 8 and the second ECU 18 via the in-vehicle network 23. In the preferred embodiment, a slip angle $\theta$sp is detected based on the yaw rate Ry and the lateral acceleration Fs. The first ECU 8 and the second ECU 18 transmit and receive control signals by communicating with each other via the in-vehicle network 23.

The first ECU 8 and the second ECU 18 execute the variable gear ratio control and the power assist control based on the above vehicle-condition parameters and control signals, which are input via the in-vehicle network 23.

The electric configuration of the steering apparatus 1 in the preferred embodiment and the control executed in the steering apparatus 1 will now be described.

Figure 4:
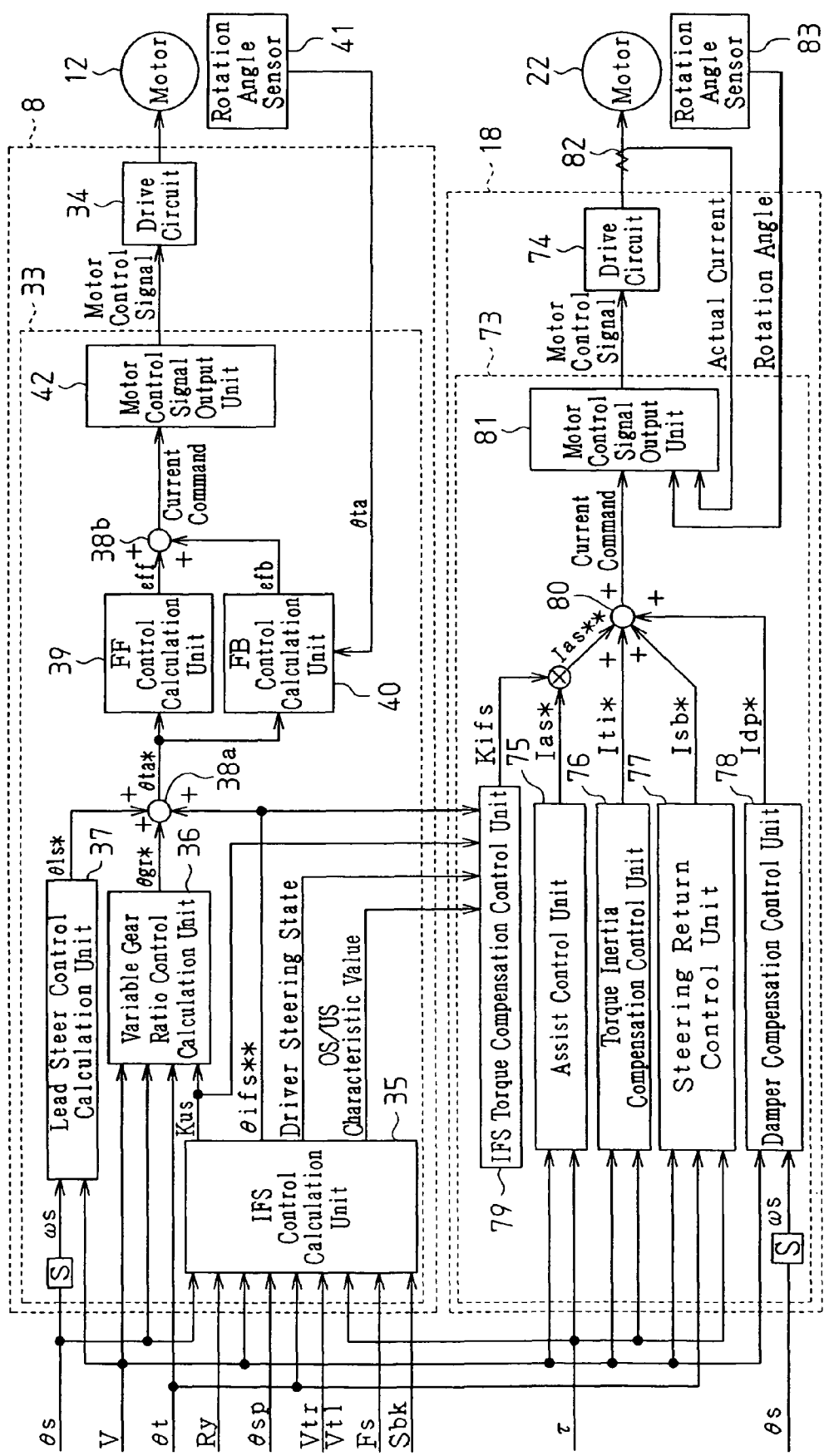
FIG. 4 is a control block diagram of the steering apparatus of FIG. 1.

FIG. 4 is a control block diagram of the steering apparatus 1 in the preferred embodiment. As shown in the drawing, the first ECU 8 includes a microcomputer 33 and a drive circuit 34. The microcomputer 33 outputs a motor control signal. The drive circuit 34 supplies the motor 12 with driving power based on the motor control signal.

In the preferred embodiment, the motors 12 and 22, which respectively function as driving sources of the variable gear ratio actuator 7 and the EPS actuator 17, are brushless motors. The drive circuit 34 and a drive circuit 74 (described later) included in the second ECU 18 supply the corresponding motors 12 and 22 with three-phase (U, V, and W) driving power based on the input motor control signal. Further, the control blocks described below are realized by the computer programs executed by the microcomputer 33 (73).

The microcomputer 33 includes an IFS control calculation unit 35, a variable gear ratio control calculation unit 36, and a lead steer control calculation unit 37. These control calculation units calculate control target elements of the ACT angle θta (and control signals) based on input vehicle-condition parameters.

In detail, the steering angle θs, the steering torque τ, the wheel velocities Vtr and Vtl, the tire angle θt, the slip angle θsp, the vehicle velocity V, the brake signal Sbk, the yaw rate Ry, and the lateral acceleration Fs are input into the IFS control calculation unit 35. Based on these vehicle-condition parameters, the IFS control calculation unit 35 calculates a control target element of the ACT angle θta and a control signal. More specifically, to stabilize the vehicle behavior by controlling the yaw moment of the vehicle, the IFS control calculation unit 35 calculates an IFS_ACT command angle θifs, which serves as a control target element of the ACT angle θta, and calculates a variable gear ratio gain Kus, which serves as a control signal, during understeer (US) control. The IFS control calculation unit 35** also determines a driver steering state and an OS/US characteristic value (IFS control calculation).

The vehicle behavior in the yaw direction is expressed as a "steering characteristic (oversteer/understeer characteristic)". The steering characteristic is the characteristic relating to the difference between the turning angle of the vehicle expected by the driver and the actual turning angle of the vehicle when the driver performs a steering operation. The "turning angle of the vehicle" may also be referred to as the driving or traveling direction of the vehicle when the vehicle is in a normal turning state. The steering characteristic is referred to as "oversteer (OS)" when the actual turning angle of the vehicle is greater than the expected turning angle of the vehicle, "understeer (US)" when the actual turning angle is less than the expected turning angle, and "neutral steer (NS)" when the actual turning angle is the same as the expected turning angle. In the vehicle model, a logical value may be used as the "turning angle of the vehicle expected by the driver".

In the preferred embodiment, the IFS control calculation unit 35 calculates the IFS_ACT command angle θifs, as a control target element of the ACT angle θta that orients each steered wheel 6 to a steering angle in the direction opposite to the direction of the yaw moment (direction of the present steering angle) (counter-steering) when the steering characteristic is oversteer. The IFS control calculation unit 35 calculates the variable gear ratio gain Kus during US control as a control signal that reduces the turning angle of each steered wheel 6 when the steering characteristic is understeer. The driver steering state and the OS/US characteristic value are used in internal calculation processing executed by the IFS control calculation unit 35 and are transmitted to the second ECU 18 via the in-vehicle network 23 (refer to FIG. 1). The driver steering state and the OS/US characteristic value are used in the power assist control executed by the second ECU 18**.

The steering angle θs, the tire angle θt, and the vehicle velocity V, as well as the variable gear ratio gain Kus during US control calculated by the IFS control calculation unit 35, are input into the variable gear ratio control calculation unit 36. Based on these vehicle-condition parameters (and the control signal), the variable gear ratio control calculation unit 36 calculates a variable gear ratio ACT command angle θgr* as a control target element that changes the gear ratio according to the vehicle velocity V (variable gear ratio control calculation).

In the preferred embodiment, a variable gear ratio ACT command angle θgr* that reduces the turning angle of each steered wheel 6 is calculated based on the variable gear ratio gain Kus during US control when the steering characteristic is understeer.

The vehicle velocity V and steering speed ωs are input into the lead steer control calculation unit 37. The steering speed ωs is calculated by differentiating the steering angle θs (the same hereinafter). Based on the vehicle velocity V and the steering speed Ωs, the lead steer control calculation unit 37 calculates an LS_ACT command angle θls* as a control target element that improves responsiveness of the vehicle according to the steering speed (lead steer control calculation).

The IFS control calculation unit 35, the variable gear ratio control calculation unit 36, and the lead steer control calculation unit 37 output to an adder 38a the control target elements obtained by the calculations described above, namely, the IFS_ACT command angle θifs**, the variable gear ratio ACT command angle θgr*, and the LS_ACT command angle θls*. The adder 38a superimposes the IFS_ACT command angle θifs**, the variable gear ratio ACT command angle θgr*, and the LS_ACT command angle θls* to calculate an ACT command angle θta*, which is a control target of the ACT angle θta.

The ACT command angle θta* calculated by the adder 38a is input into an FF control calculation unit 39 and an FB control calculation unit 40. The ACT angle θta, which is detected by a rotation angle sensor 41 included in the motor 12, is input into the FB control calculation unit 40. The FF control calculation unit 39 calculates a control amount εff through feed forward calculation based on the input ACT command angle θta*. The FB control calculation unit 40 calculates a control amount εfb through feedback calculation based on the ACT command angle θta* and the ACT angle θta.

The FF control calculation unit 39 and the FB control calculation unit 40 output their calculated control amounts εff and εfb to an adder 38b. The adder 38b superimposes the control amounts εff and εfb. The resulting value is input, as a current command, into a motor control signal output unit 42. The motor control signal output unit 42 generates a motor control signal based on the input current command, and outputs the motor control signal to the drive circuit 34.

Figure 5:
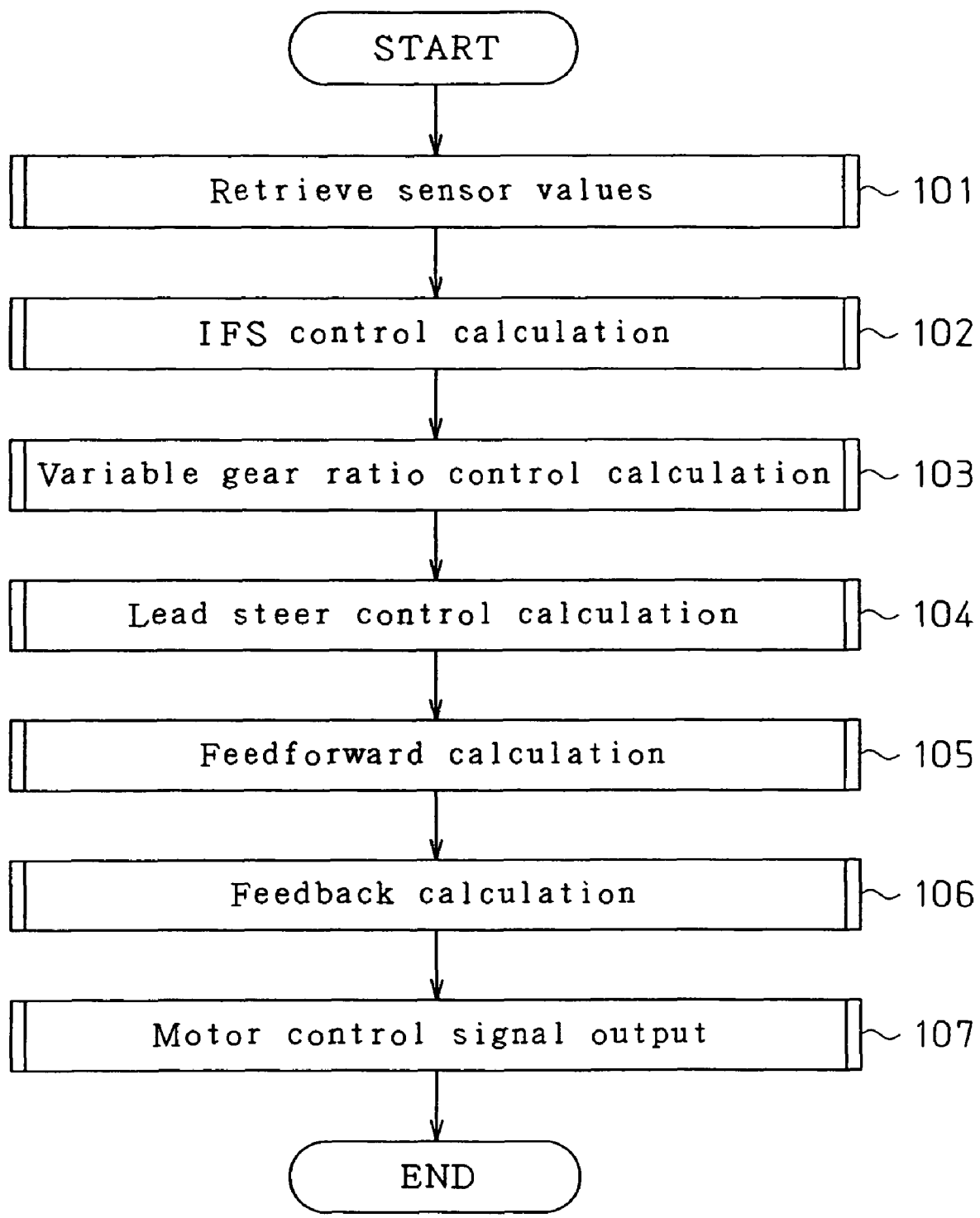
FIG. 5 is a flowchart showing a calculation process executed by the first ECU shown in FIG. 4.

More specifically, as shown in the flowchart of FIG. 5, the microcomputer 33 retrieves sensor values from the above sensors as vehicle-condition parameters (step 101). The microcomputer 33 first executes the IFS control calculation (step 102), and then executes the variable gear ratio control calculation (step 103) and the lead steer control calculation (step 104). The microcomputer 33 superimposes an IFS_ACT command angle θifs**, a variable gear ratio ACT command angle θgr*, and an LS_ACT command angle θls*, which are obtained by executing the calculation processing of steps 102 to 104 to calculate a control target, namely, an ACT command angle θta*.

The microcomputer 33 executes feed forward calculation (step 105) and feedback calculation (step 106) based on the ACT command angle θta* to calculate a current command. The microcomputer 33 outputs a motor control signal based on the current command (step 107).

An IFS control calculation process executed by the IFS control calculation unit 35 will now be described in detail.

Figure 6:
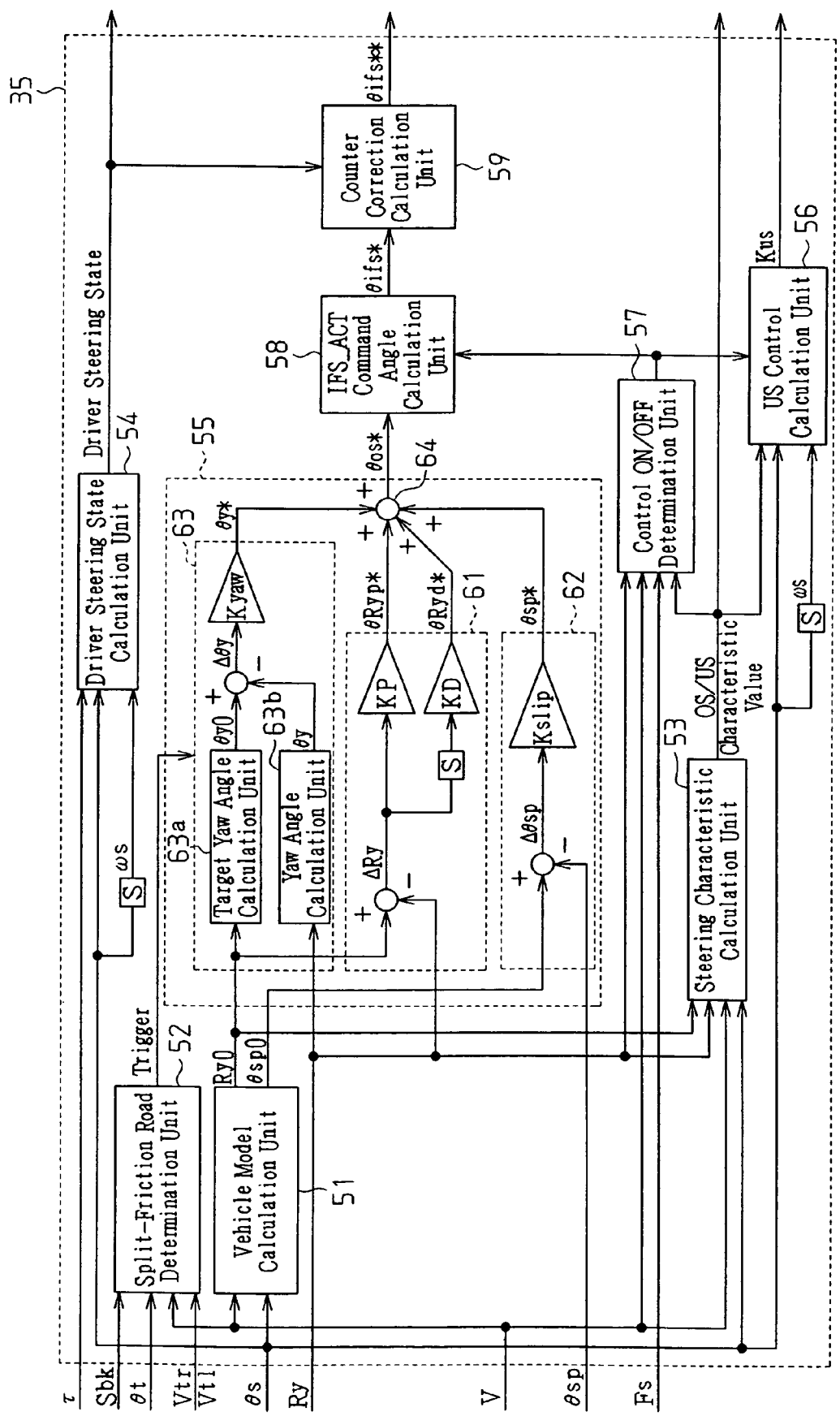
FIG. 6 is a control block diagram of the IFS control calculation unit shown in FIG. 4.

FIG. 6 is a control block diagram of the IFS control calculation unit 35. As shown in the drawing, the IFS control calculation unit 35 includes a vehicle model calculation unit 51, a split-friction road determination unit 52, a steering characteristic calculation unit 53, a driver steering state calculation unit 54, an OS control calculation unit 55, an US control calculation unit 56, a control ON/OFF determination unit 57, an IFS_ACT command angle calculation unit 58, and a counter correction calculation unit 59. In the preferred embodiment, the steering characteristic calculation unit 53 functions as a determination unit, and the driver steering state calculation unit 54 functions as a steering state determination unit.

The steering angle θs and the vehicle velocity V are input into the vehicle model calculation unit 51. The vehicle model calculation unit 51 executes vehicle model calculation based on the steering angle θs and the vehicle velocity V to calculate a target yaw rate Ry0 and a target slip angle θsp0.

The vehicle model calculation executed by the vehicle model calculation unit 51 in the preferred embodiment, namely, the process for calculating the target yaw rate Ry0 and the target slip angle θsp0 from the steering angle θs and the vehicle velocity V based on the vehicle model is well known and described, for example, in Japanese Laid-Open Patent Publication No. 2002-254964 cited above. Thus, the vehicle model calculation process will not be described.

The wheel velocities Vtr and Vtl, the tire angle θt, the vehicle velocity V, and the brake signal Sbk are input into the split-friction road determination unit 52. Based on these vehicle-condition parameters, the split-friction road determination unit 52 determines whether the vehicle is on a split-friction road, that is, whether right and left wheels of the vehicle are respectively on two road surfaces that have particularly different friction coefficients (on a split-friction surface). In detail, the split-friction road determination unit 52 determines whether the vehicle is in a braking state for a split-friction surface, or in a split-friction braking state (split-friction road determination).

The steering angle θs, the vehicle velocity V, and the yaw rate Ry, as well as the target yaw rate Ry0 calculated by the vehicle model calculation unit 51, are input into the steering characteristic calculation unit 53. Based on these vehicle-condition parameters, the steering characteristic calculation unit 53 determines the steering characteristic of the vehicle, that is, determines whether the vehicle is in an oversteer state, an understeer state, or a neutral steer state. The steering characteristic calculation unit 53 calculates an OS/US characteristic value indicating the determined steering characteristic (steering characteristic calculation).

In the preferred embodiment, the OS/US characteristic is calculated as an analog value that continuously changes. A positive OS/US characteristic value represents an OS characteristic. A negative OS/US characteristic value represents a US characteristic. The absolute value of the OS/US characteristic value indicates the degree of the steering characteristic. Accordingly, the OS/US characteristic value being zero (specifically, when the value is in a predetermined range) represents an NS characteristic.

The steering torque τ, the steering angle θs, and the steering speed ωs are input into the driver steering state calculation unit 54. Based on the steering torque τ, the steering angle θs, and the steering speed ωs, the driver steering state calculation unit 54 determines the steering state of the driver. To be specific, the driver steering state calculation unit 54 determines whether the steering operation performed by the driver is a veer-away operation that increases the absolute amount of the steering angle θs or a veer-back operation that decreases the absolute amount of the steering angle θs (driver steering state calculation).

The OS control calculation unit 55 includes a yaw rate FB calculation unit 61, a slip angle FB calculation unit 62, and a yaw angle FB calculation unit 63. These FB calculation units execute feedback calculation to adjust input vehicle-condition parameters to target values of the parameters.

In detail, the yaw rate Ry, and the target yaw rate Ry0 calculated by the vehicle model calculation unit 51, are input into the yaw rate FB calculation unit 61. The yaw rate FB calculation unit 61 executes feedback calculation based on the difference ΔRy between the yaw rate Ry and the target yaw rate Ry0. In detail, the yaw rate FB calculation unit 61 multiplies the difference ΔRy by a proportional FB gain KP to calculate a yaw rate proportional FB command angle θRyp*. The yaw rate FB calculation unit 61 multiples a differentiation amount of the difference ΔRy by a differentiation FB gain KD to calculate a yaw rate differentiation FB command angle θRyd* (yaw rate FB calculation).

The slip angle θsp, and the target slip angle θsp0 calculated by the vehicle model calculation unit 51, are input into the slip angle FB calculation unit 62. The slip angle FB calculation unit 62 multiplies the difference Δθsp between the slip angle θsp and the target slip angle θsp0 by a slip angle FB gain Kslip to calculate a slip angle FB command angle θsp* (slip angle FB calculation).

The target yaw rate Ry0 and the yaw rate Ry are input into the yaw angle FB calculation unit 63. The yaw angle FB calculation unit 63 includes a target yaw angle calculation unit 63a and a yaw angle calculation unit 63b. The target yaw angle calculation unit 63a and the yaw angle calculation unit 63b integrate the target yaw rate Ry0 and the yaw rate Ry input respectively to calculate a target yaw angle θy0 and a yaw angle θy. The yaw angle FB calculation unit 63 multiplies the difference Δθy between the target yaw angle θy0 and the yaw angle θy by a yaw angle FB gain Kyaw to calculate a yaw angle FB command angle θy* (yaw angle FB calculation).

In the preferred embodiment, a determination result of the split-friction road determination unit 52 is input, as a trigger, into the yaw angle FB calculation unit 63. When the split-friction road determination unit 52 determines that the vehicle is not in a split-friction braking state, the yaw angle FB calculation unit 63 does not execute the yaw angle FB calculation.

The above-described control target elements of the vehicle-condition parameters, which are calculated by the yaw rate FB calculation unit 61, the slip angle FB calculation unit 62, and the yaw angle FB calculation unit 63, namely, the yaw rate proportional FB command angle θRyp*, the yaw rate differential FB command angle θRyd*, the slip angle FB command angle θsp*, and the yaw angle FB command angle θy* are input into an adder 64.

The OS control calculation unit 55 superimposes these control target elements in the adder 64 to calculate an ACT command angle θos* during OS control as a control target element of the ACT angle θta when the steering characteristic is oversteer, that is, as a control target element that orients each steered wheel 6 to a steering angle in the direction opposite to the direction of the yaw moment (counter-steering) (OS control calculation).

The steering angle θs and the steering speed ωs, as well as the OS/US characteristic value calculated by the steering characteristic calculation unit 53, are input into the US control calculation unit 56. Based on these vehicle-condition parameters, the US control calculation unit 56 calculates a variable gear ratio gain Kus during US control (US control calculation).

A control ON/OFF signal is input into the US control calculation unit 56 as a determination result of a control ON/OFF determination (described later) executed by the control ON/OFF determination unit 57. The US control calculation unit 56 outputs the variable gear ratio gain Kus during US control, which is obtained by the above US control calculation, when the control ON/OFF signal is a signal indicative of "US control ON". When the control ON/OFF signal input from the control ON/OFF determination unit 57 is not a signal indicative of "US control ON", the US control calculation unit 56 sets the variable gear ratio gain Kus during US control at "1" and outputs the variable gear ratio gain Kus during US control to the variable gear ratio control calculation unit 36.

In the preferred embodiment, the vehicle velocity V, the yaw rate Ry, and the lateral acceleration Fs, as well as the OS/US characteristic value calculated by the steering characteristic calculation unit 53, are input into the control ON/OFF determination unit 57. Based on these vehicle-condition parameters, the control ON/OFF determination unit 57 determines whether oversteer (OS) control based on the ACT command angle θos* during OS control, which is calculated by the OS control calculation unit 55, is to be executed, or whether understeer (US) control based on the variable gear ratio gain Kus during US control, which is calculated by the US control calculation unit 56, is to be executed (control ON/OFF determination).

The control ON/OFF determination unit 57 outputs a determination result of the control ON/OFF determination, as a control ON/OFF signal, to the US control calculation unit 56 and the IFS_ACT command angle calculation unit 58. More specifically, the control ON/OFF determination unit 57 outputs, as the control ON/OFF signal, a signal indicative of "OS control ON" meaning that OS control is to be executed, a signal indicative of "US control ON" meaning that US control is to be executed, or a signal indicative of "control OFF" meaning that neither OS control nor US control is to be executed.

The above control ON/OFF signal and the ACT command angle θos* during OS control calculated by the OS control calculation unit 55 are input into the IFS_ACT command angle calculation unit 58. Based on the ACT command angle θos* during OS control and the control ON/OFF signal, the IFS_ACT command angle calculation unit 58 calculates an IFS_ACT command angle θifs* (IFS_ACT command angle calculation).

To be specific, the IFS_ACT command angle calculation unit 58 sets the ACT command angle θos* during OS control as the IFS_ACT command angle θifs* when the input control ON/OFF signal is a signal indicative of "OS control ON", and sets the IFS_ACT command angle θifs* at "0" when the control ON/OFF signal is not a signal indicative of "OS control ON".

The IFS_ACT command angle θifs* and the above driver steering state calculated by the driver steering state calculation unit 54 are input into the counter correction calculation unit 59. The counter correction calculation unit 59 executes calculation to correct the IFS_ACT command angle θifs* based on the input driver steering state. The counter correction calculation unit 59 outputs the corrected IFS_ACT command angle θifs** (counter correction calculation). In the preferred embodiment, the above steering state of the driver is input as a counter correction gain. In the counter correction calculation, the counter correction calculation unit 59 multiplies the IFS_ACT command angle θifs* by the counter correction gain to calculate the IFS_ACT command angle θifs**.

The IFS control calculation unit 35 executes the IFS control calculation by the above-described calculation units (determination units) executing the calculation processing (determination processing) described below.

Figure 7:
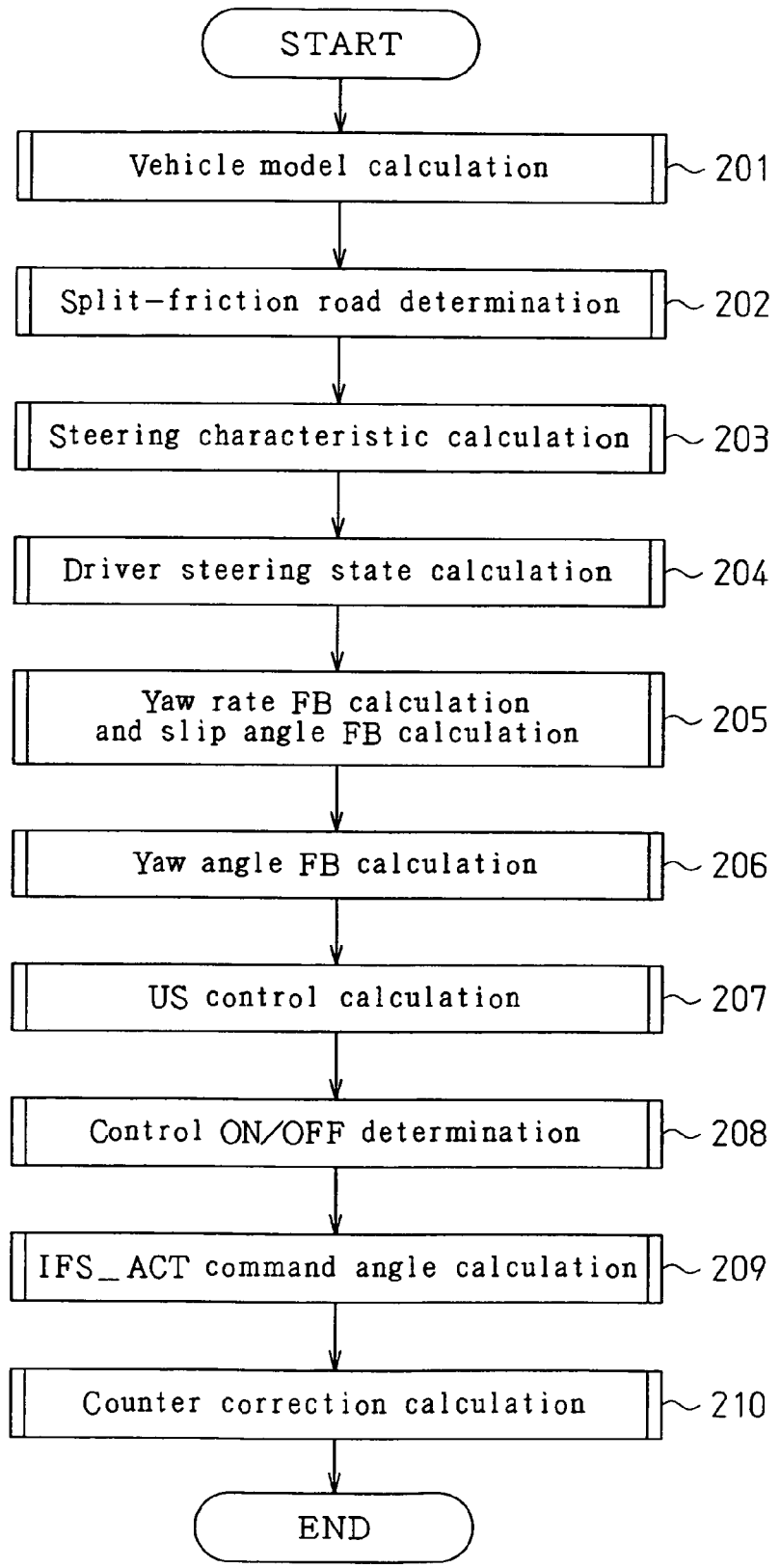
FIG. 7 is a flowchart showing an IFS control calculation process executed by the IFS control calculation unit of FIG. 6.

To be specific, as shown in the flowchart of FIG. 7, the IFS control calculation unit 35 first executes the vehicle model calculation (step 201) and then executes the split-friction road determination (step 202). The IFS control calculation unit 35 subsequently executes the steering characteristic calculation (step 203) and then executes the driver steering state calculation (step 204).

Next, the IFS control calculation unit 35 executes the yaw rate FB calculation and the slip angle FB calculation based on the target yaw rate Ry0 and the target slip angle θsp0 calculated in the vehicle model calculation in step 201 described above (step 205). Using the determination result of the split-friction road determination in step 202 as a trigger, the IFS control calculation unit 35 executes the yaw angle FB calculation (step 206).

The IFS control calculation unit 35 calculates control target elements corresponding to the vehicle-condition parameters through the above FB calculations in steps 205 and 206. The IFS control calculation unit 35 superimposes the control target elements to calculate an ACT command angle θos* during OS control as a control target element of the ACT angle θta, which serves as a basis for OS control.

Next, the IFS control calculation unit 35 executes the US control calculation (step 207), and then executes the control ON/OFF determination (step 208). Based on the determination result in step 208, the IFS control calculation unit 35 outputs the variable gear ratio gain Kus during US control for US control, or executes the IFS_ACT command angle calculation to calculate an IFS_ACT command angle θifs* as a control target element of the ACT angle θta for OS control (step 209). After executing step 209, the IFS control calculation unit 35 executes the counter correction calculation based on a driver steering state calculated in step 204 and outputs an IFS_ACT command angle θifs** (step 210).

The control block of the second ECU will now be described.

As shown in FIG. 4, like the first ECU 8, the second ECU 18 includes a microcomputer 73 and a drive circuit 74. The microcomputer 73 includes an assist control unit 75, a torque inertia compensation control unit 76, a steering wheel return control unit 77, and a damper compensation control unit 78. These control units calculate control target elements of an assist torque generated by the motor 22 based on input vehicle-condition parameters.

In detail, the vehicle velocity V and the steering torque τ are input into each of the assist control unit 75 and the torque inertia compensation control unit 76. The assist control unit 75 calculates a basic assist current command Ias* as a control target element that serves as a basis (assist control calculation). The torque inertia compensation control unit 76 calculates an inertia compensation current command Iti*, which is a control target element for compensating the inertia of the motor 22 (torque inertia compensation control calculation).

The vehicle velocity V, the steering torque τ, and the tire angle θt are input into the steering wheel return control unit 77. The vehicle velocity V and the steering speed ωs are input into the damper compensation control unit 78. The steering wheel return control unit 77 calculates a steering wheel return current command Isb*, which is a control target element for improving the return characteristic of the steering wheel 2 (steering wheel return control calculation). The damper compensation control unit 78 calculates a damper compensation current command Idp*, which is a control target element for improving the power assist characteristic of the vehicle when the vehicle is traveling at a high velocity (damper compensation control calculation).

The microcomputer 73 further includes an IFS torque compensation control unit 79. The IFS_ACT command angle θifs, the variable gear ratio gain Kus during US control, the driver steering state, and the OS/US characteristic value, which are calculated by the IFS control calculation unit 35 included in the first ECU 8, are input into the IFS torque compensation control unit 79. Based on the IFS_ACT command angle θifs, the variable gear ratio gain Kus during US control, the driver steering state, and the OS/US characteristic value, the IFS torque compensation control unit 79 calculates an IFS torque compensation gain Kifs for improving the steering feel during IFS control (IFS torque compensation control calculation).

The inertia compensation current command Iti*, the steering wheel return current command Isb*, and the damper compensation current command Idp*, which are calculated by the torque inertia compensation control unit 76, the steering wheel return control unit 77, and the damper compensation control unit 78 respectively, are input into an adder 80. The basic assist current command Ias*, which is calculated by the assist control unit 75, is multiplied by the IFS torque compensation gain Kifs, which is calculated by the IFS torque compensation control unit 79. The corrected basic assist current command Ias is input into the adder 80. In the preferred embodiment, the basic assist current command Ias increases as the IFS torque compensation gain Kifs increases. The adder 80 superimposes these control target elements to calculate a current command, which is a control target of the assist torque generated by the motor 22.

The current command calculated by the adder 80 is input into a motor control signal output unit 81. An actual current and a rotation angle, which are detected by a current sensor 82 and a rotation angle sensor 83 included in the motor 22, are input into the motor control signal output unit 81. The motor control signal output unit 81 executes feedback control based on the current command, the actual current, and the rotation angle, to generate a motor control signal. The motor control signal output unit 81 outputs the motor control signal to the drive circuit 74.

Figure 8:
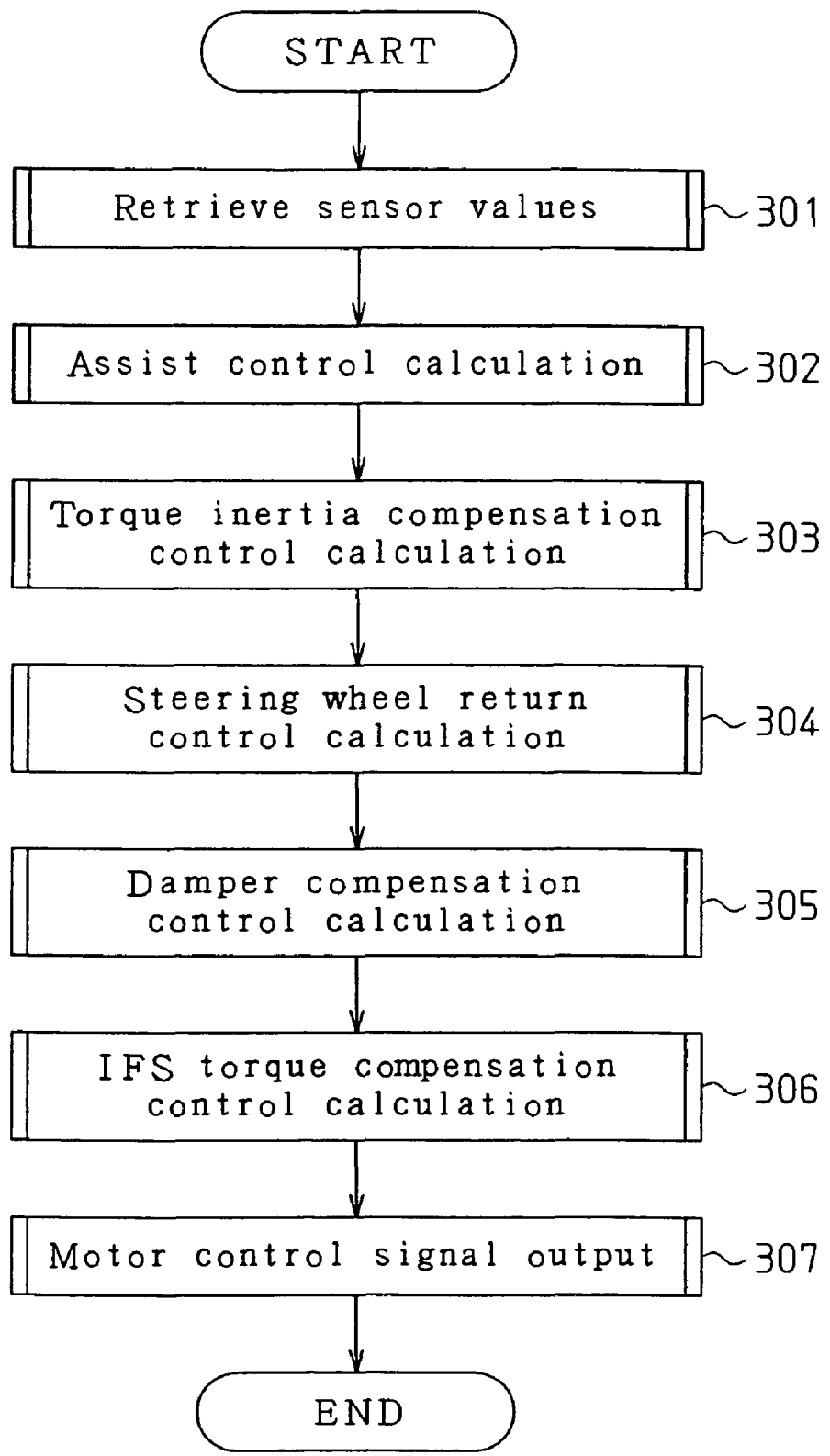
FIG. 8 is a flowchart showing a calculation process executed by the second ECU shown in FIG. 4.

More specifically, as shown in the flowchart of FIG. 8, the microcomputer 73 retrieves sensor values from the above sensors as vehicle-condition parameters (step 301). The microcomputer 73 first executes the assist control calculation (step 302), and then executes the torque inertia compensation control calculation (step 303), the steering wheel return control calculation (step 304), and the damper compensation control calculation (step 305), and then the IFS torque compensation control calculation (step 306).

The microcomputer 73 multiplies the basic assist current command Ias*, which is calculated through the assist control calculation in step S302, by the IFS torque compensation gain Kifs, which is calculated in step 306, to correct the basic assist current command Ias*. The microcomputer 73 superimposes, on the corrected basic assist current command Ias**, the control target elements, the inertia compensation current command Iti*, the steering wheel return current command Isb*, and the damper compensation current command Idp*, which are obtained by executing the above calculation processing of steps 303 to 305 to calculate a current command, which serves as a control target. The microcomputer 73 outputs a motor control signal based on the current command (step 307).

An IFS torque compensation control calculation process executed by the IFS torque compensation control unit 79 will now be described in detail.

Figure 9:
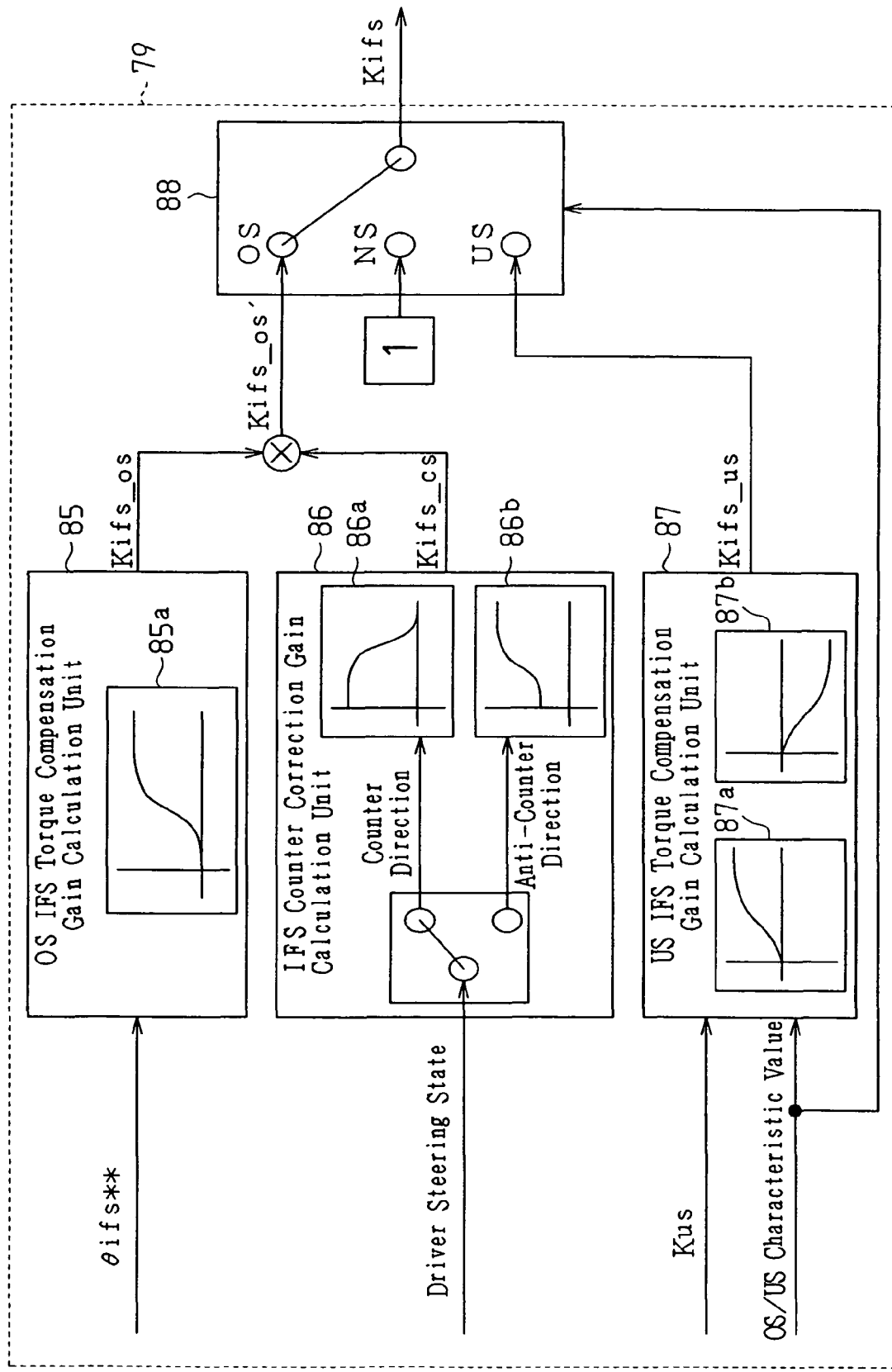
FIG. 9 is a control block diagram of the IFS torque compensation control unit shown in FIG. 4.

FIG. 9 is a control block diagram of the IFS torque compensation control unit 79. As shown in the drawing, the IFS torque compensation control unit 79 includes an OS IFS torque compensation gain calculation unit 85, an IFS counter correction gain calculation unit 86, a US IFS torque compensation gain calculation unit 87, and an output switch unit 88. In the preferred embodiment, the OS IFS torque compensation gain calculation unit 85 functions as a compensation gain calculation unit.

The IFS_ACT command angle θifs is input into the OS IFS torque compensation gain calculation unit 85. The OS IFS torque compensation gain calculation unit 85 calculates an IFS torque compensation gain Kifs_os during OS control based on the IFS_ACT command angle θifs.

In the preferred embodiment, the OS IFS torque compensation gain calculation unit 85 has a map 85a associating the IFS_ACT command angle θifs with the IFS torque compensation gain Kifs_os during OS control. The map 85a is set so that the IFS torque compensation gain Kifs_os during OS control increases as the IFS_ACT command angle θifs increases. In the drawing, the horizontal axis indicates the IFS_ACT command angle θifs**, and the vertical axis indicates the IFS torque compensation gain Kifs_os during OS control. The horizontal axis indicates an input value and the vertical axis indicates an output element (gain). The same applies to other maps described later.

The OS IFS torque compensation gain calculation unit 85 calculates an IFS torque compensation gain Kifs_os during OS control based on an input IFS_ACT command angle θifs and the map 85a. Thus, the OS IFS torque compensation gain calculation unit 85 calculates a larger IFS torque compensation gain Kifs_os during OS control for a larger input IFS_ACT command angle θifs.

A driver steering state is input into the IFS counter correction gain calculation unit 86. In the preferred embodiment, an analog value, which continuously changes according to the direction in which the steering wheel 2 is operated by the driver and the operation amount of the steering operation, is input into the IFS counter correction gain calculation unit 86 as the driver steering state. The analog value being either a negative or positive value indicates the direction of the steering operation (veer-away or veer-back), and the absolute value of the analog value indicates the operation amount of the steering operation. The IFS counter correction gain calculation unit 86 calculates the IFS counter correction gain Kifs_cs based on the driver steering state.

More specifically, the IFS counter correction gain calculation unit 86 has two maps 86a and 86b respectively for the directions of the steering operation performed by the driver. The maps 86a and 86b associate the operation amount of the steering operation with the IFS counter correction gain Kifs_cs. The map 86a corresponds to the case in which the steering operation performed by the driver is in the same direction as the counter direction. The map 86a is set so that the IFS counter correction gain Kifs_cs decreases as the operation amount increases. The map 86b corresponds to the case in which the steering operation performed by the driver is in the direction opposite to the counter direction. The map 86b is set so that the IFS counter correction gain Kifs_cs increases as the operation amount increases.

The IFS counter correction gain calculation unit 86 determines whether the steering operation is in the same direction as the counter direction (counter direction) or in the direction opposite to the counter direction (anti-counter direction) based on the driver steering state. The IFS counter correction gain calculation unit 86 calculates the IFS counter correction gain Kifs_cs using the map 86a when the steering operation performed by the driver is in the counter direction. The IFS counter correction gain calculation unit 86 calculates the IFS counter correction gain Kifs_cs using the map 86*b* when the steering operation is in the anti-counter direction.

In this way, the IFS counter correction gain calculation unit 86 calculates a smaller IFS counter correction gain Kifs_cs for a larger operation amount of the steering operation when the steering operation performed by the driver is in the same direction as the counter direction, and calculates a larger IFS counter correction gain Kifs_cs for a larger operation amount of the steering operation when the steering operation performed by the driver is in the direction opposite to the counter direction.

In the preferred embodiment, the IFS torque compensation gain Kifs_os during OS control calculated by the OS IFS torque compensation gain calculation unit 85 is corrected. More specifically, the IFS torque compensation gain Kifs_os during OS control is multiplied by the IFS counter correction gain Kifs_cs. The corrected IFS torque compensation gain Kifs_os' during OS control increases as the IFS counter correction gain Kifs_cs increases, and the corrected IFS torque compensation gain Kifs_os' during OS control decreases as the IFS counter correction gain Kifs_cs decreases. The corrected IFS torque compensation gain Kifs_os' during OS control is input into the output switch unit 88.

The variable gear ratio gain Kus during US control is input into the US IFS torque compensation gain calculation unit 87. The US IFS torque compensation gain calculation unit 87 calculates an IFS torque compensation gain Kifs_us during US control based on the variable gear ratio gain Kus during US control.

In the preferred embodiment, the US IFS torque compensation gain calculation unit 87 has two maps 87*a* and 87*b* associating the variable gear ratio gain Kus during US control with the IFS torque compensation gain Kifs_us during US control. The US IFS torque compensation gain calculation unit 87 calculates the IFS torque compensation gain Kifs_us during US control based on the maps 87*a* and 87*b*.

More specifically, the map 87*a* is set so that the IFS torque compensation gain Kifs_us during US control increase as the input variable gear ratio gain Kus during US control increases. The map 87*b* is set so that the IFS torque compensation gain Kifs_us during US control decreases as the input variable gear ratio gain Kus during US control increases. The US IFS torque compensation gain calculation unit 87 switches the maps 87*a* and 87*b* in accordance with the circumstances to calculate the IFS torque compensation gain Kifs_us during US control. In the drawing, the reference line in each of the maps 87*a* and 87*b* indicates "1".

In the preferred embodiment, the variable gear ratio gain Kus during US control and the OS/US characteristic value are input into the US IFS torque compensation gain calculation unit 87. For a predetermined time (0.5 seconds in the preferred embodiment) from when a value at which US control is to be started is input as the OS/US characteristic value, the US IFS torque compensation gain calculation unit 87 calculates the IFS torque compensation gain Kifs_us during US control using the map 87*a*. After the predetermined time elapses, the US IFS torque compensation gain calculation unit 87 calculates the IFS torque compensation gain Kifs_us during US control using the map 87*b*.

Thus, in the predetermined time from the start of the US control, the US IFS torque compensation gain calculation unit 87 calculates a larger IFS torque compensation gain Kifs_us during US control for a larger control amount of the US control. After the predetermined time elapses, the US IFS torque compensation gain calculation unit 87 calculates a smaller IFS torque compensation gain Kifs_us during US control for a larger control amount of the US control. The calculated IFS torque compensation gain Kifs_us during US control is output to the output switch unit 88.

The IFS torque compensation gain Kifs_os' during OS control and the IFS torque compensation gain Kifs_us during US control, as well as the OS/US characteristic value, are input into the output switch unit 88. The output switch unit 88 outputs the IFS torque compensation gain Kifs_os' during OS control as the IFS torque compensation gain Kifs when the input OS/US characteristic value is a value indicating the OS characteristic, and outputs the IFS torque compensation gain Kifs_us during US control as the IFS torque compensation gain Kifs when the OS/US characteristic value is a value indicating the US characteristic. The output switch unit 88 outputs "1" as the IFS torque compensation gain Kifs when the OS/US characteristic value is a value (substantially zero) indicating the NS characteristic.

The IFS torque compensation control calculation process will now be described.

Figure 10:
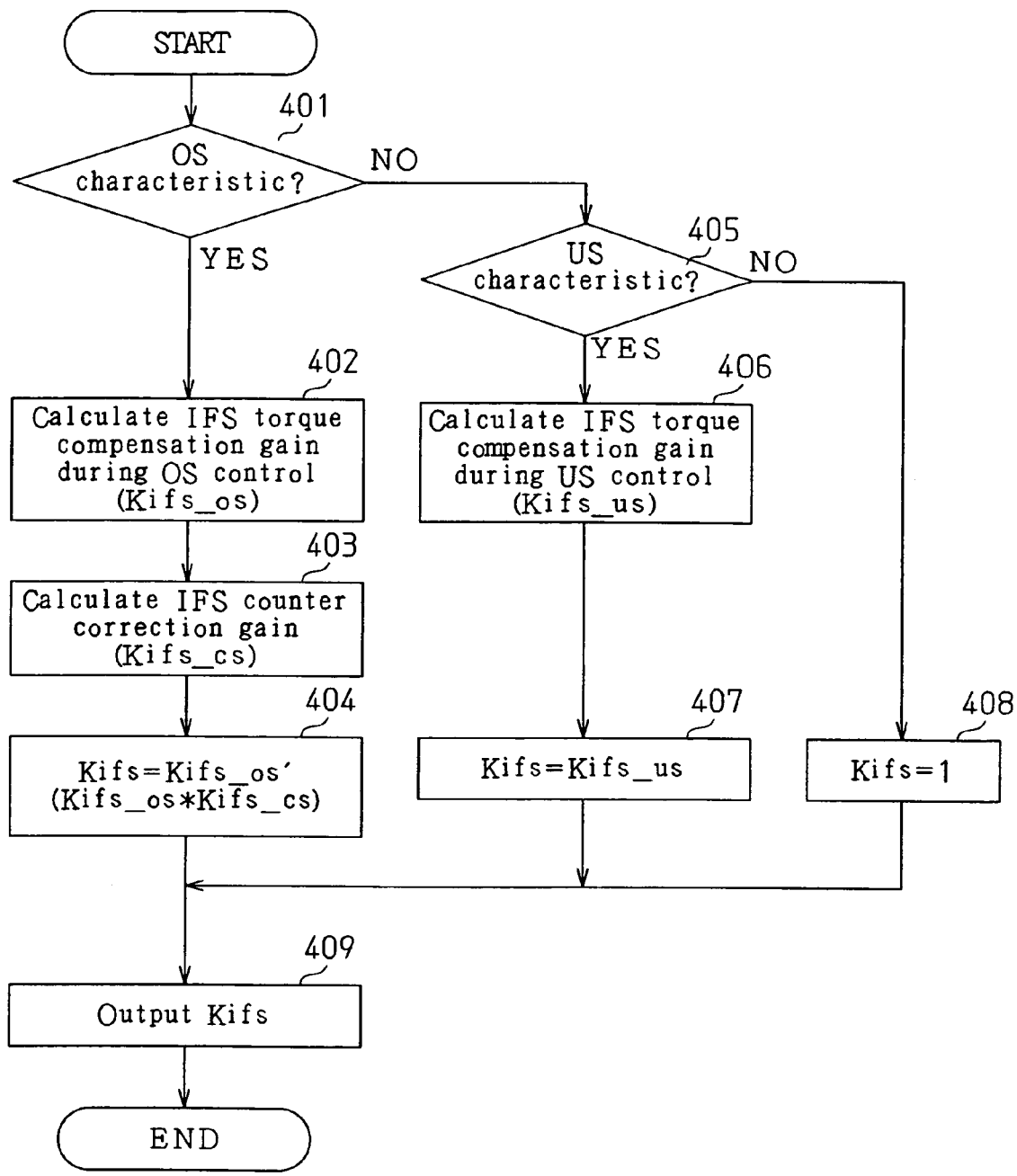
FIG. 10 is a flowchart showing an IFS torque compensation control calculation process executed by the IFS torque compensation control unit of FIG. 9.

As shown in the flowchart of FIG. 10, the IFS torque compensation control unit 79 first determines whether the OS/US characteristic value indicates the OS characteristic (step 401). When determining that the OS/US characteristic value indicates the OS characteristic (step 401: YES), the IFS torque compensation control unit 79 executes the IFS torque compensation gain calculation during OS control (step 402), and executes the IFS counter correction gain calculation (step 403). The IFS torque compensation control unit 79 sets, as the IFS torque compensation gain Kifs, the corrected IFS torque compensation gain Kifs_os' during OS control, which is obtained by multiplying the IFS torque compensation gain Kifs_os during OS control calculated in step 402, which is described above, by the IFS counter correction gain Kifs_cs calculated in step 403, which is described above (step 404).

When determining that the OS/US characteristic value does not indicate the OS characteristic in step 401 (step 401: NO), the IFS torque compensation control unit 79 next determines whether the OS/US characteristic value indicates the US characteristic (step 405). When determining that the OS/US characteristic value indicates the US characteristic (step 405: YES), the IFS torque compensation control unit 79 executes the IFS torque compensation gain calculation during US control (step 406), and sets, as the IFS torque compensation gain Kifs, the calculated IFS torque compensation gain Kifs_us during US control, which is calculated in step 406 (step 407).

When determining that the OS/US characteristic value does not indicate the US characteristic (that is, indicates the NS characteristic) in step 405 (step 405: NO), the IFS torque compensation control unit 79 sets the IFS torque compensation gain Kifs at "1" (step 408). Then, the IFS torque compensation control unit 79 outputs the IFS torque compensation gain Kifs, which is calculated in step 404, step 407, or step 408 (step 409).

The operation of the steering apparatus 1 will now be discussed.

[During Steering Operation]

First, the balance of forces applied to the steering system when each steered wheel oriented to a certain steering angle by the steering operation, and the relationship between the steering torque and the assist torque will be described.

Figure 11:
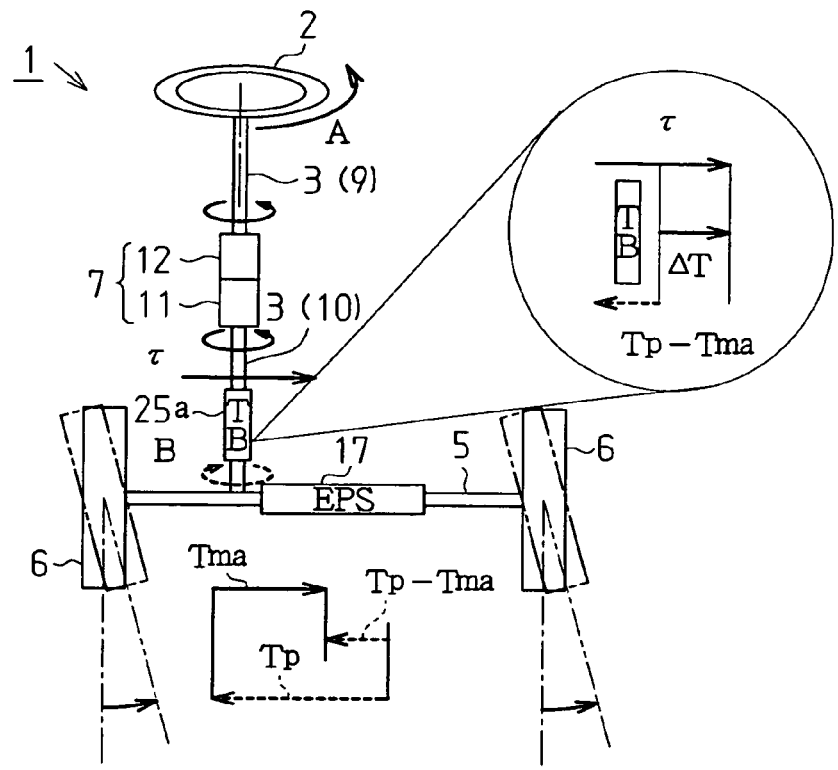
FIG. 11 is an explanatory diagram showing the balance of forces applied to the steering system in the steering apparatus of FIG. 1 when the steered wheels are steered to a certain steering angle through a steering operation.
Figure 12:
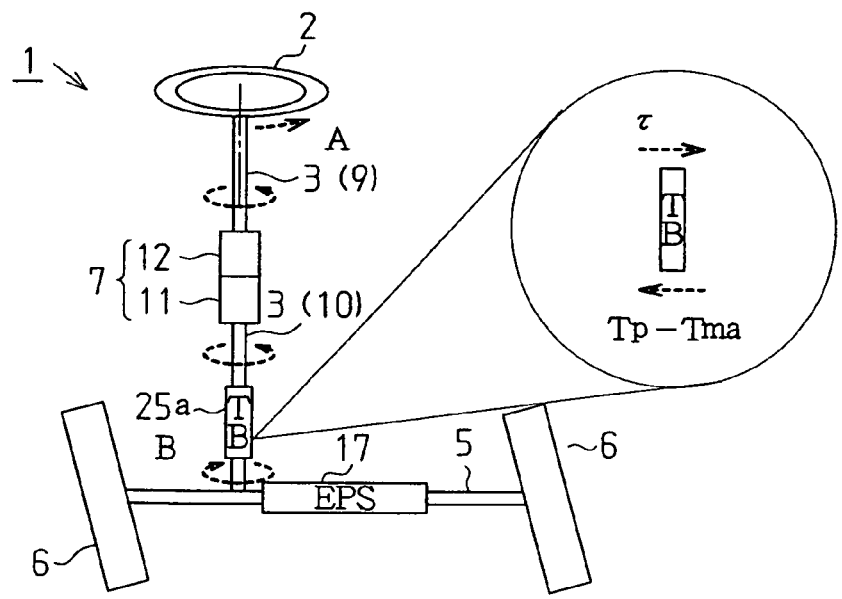
FIG. 12 is an explanatory diagram showing the balance of forces in the steering apparatus of FIG. 1 when the steering angle becomes constant.

FIG. 11 is an explanatory diagram showing the balance of forces applied to the steering system when each steered wheel is oriented to a steering angle by the steering operation. FIG. 12 is an explanatory diagram showing the balance of forces when the steering angle is constant.

As shown in FIG. 11, when the steering wheel 2 is operated in direction A as viewed in the drawing (counterclockwise), its steering torque τ causes the steering shaft 3 to rotate in direction A. Then, the movement of the rack 5 orients the steered wheels 6 to a steering angle in the rightward direction as viewed in the drawing.

At the same time as when the steered wheels 6 is oriented to the steering angle, a tire returning force Tp hindering the movement of the steered wheels 6 is generated in the steered wheels 6. Thus, a torque that causes the steering shaft 3 to rotate in the direction opposite to the direction in which the steering wheel 2, that is, in direction B as shown in the drawing (clockwise), is generated at the basal end of the steering shaft 3. The steering torque τ and the tire returning force Tp cause torsion to be generated in a torsion bar 25a of a torque sensor 25.

In this state, the second ECU 18 actuates the EPS actuator 17 to apply an assist torque Tma in a direction that reduces the torsion of the torsion bar 25a, or in a direction that counteracts the above tire returning force Tp. This reduces the torque that causes the steering shaft 3 to rotate in direction B to be the value obtained by subtracting the assist torque Tma from the tire returning force Tp.

The torque difference ΔT between "the tire returning force Tp—the assist torque Tma" and the steering torque τ causes the steering shaft 3 to rotate in direction A so that the steering angle of the steered wheels 6 increases. Then, as shown in FIG. 12, when the torque difference ΔT becomes zero, that is, when the force that causes the steering wheel 2 to return to its original position (the tire returning force Tp—the assist torque Tma) is balanced with the steering torque τ that causes the steering wheel 2 to be held against the returning force, the steering angle of the steered wheels 6 becomes constant.

[During OS Control]

The operation of the steering apparatus 1 during OS control will now be described.

Figure 13:
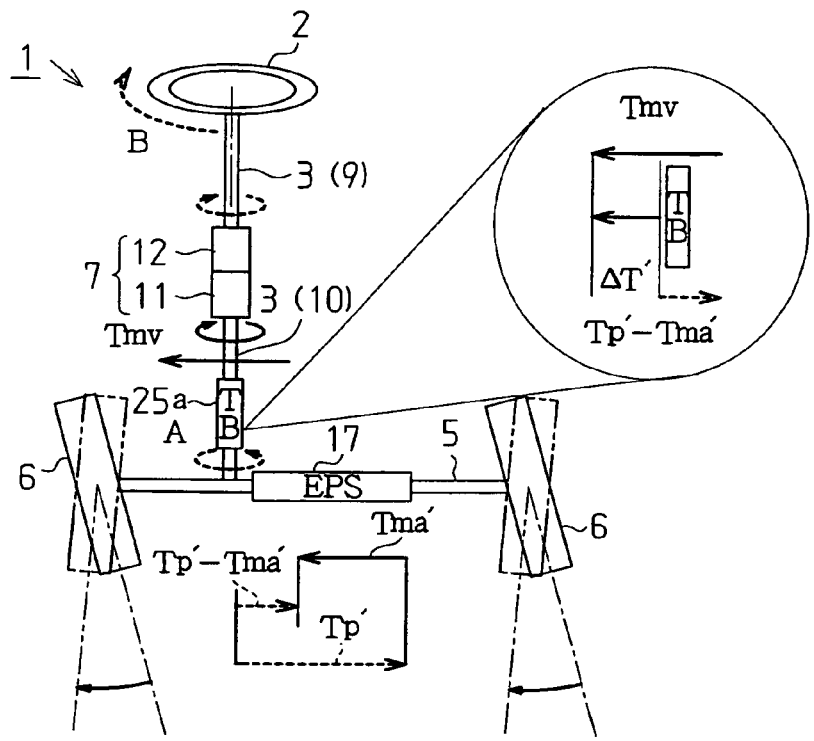
FIG. 13 is an explanatory diagram showing the balance of forces applied to the steering system during OS control in the steering apparatus of FIG. 1.

FIG. 13 is an explanatory diagram showing the balance of forces applied to the steering system during OS control. As shown in the drawing, during OS control, actuation of the variable gear ratio actuator 7, that is, a motor torque Tmv generated by the motor 12, causes the second shaft 10 to rotate in direction B as viewed in the drawing (clockwise). The rotation of the second shaft 10 orients each steered wheel 6 to ACT angle θta in the direction opposite to the direction of the present steering angle, or in the counter direction (leftward direction as viewed in the drawing).

When the ACT angle θta to which the steered wheels are oriented is increased in the counter direction faster then the spontaneous returning of the steered wheels to their original position due to the current tire returning force Tp, a tire returning force Tp' in the opposite direction that hinders the movement of the steered wheel is generated. The tire returning force Tp' increases as the ACT angle θta changes faster.

The tire returning force Tp' generates torque that hinders the rotation of the second shaft 10 (in direction A as viewed in the drawing) at the basal end of the second shaft 10. The generated torque causes torsion to be generated in the torsion bar 25a so that an assist torque Tma' is applied in a direction that counteracts the tire returning force Tp'. The torque difference ΔT' is expressed as the motor torque Tmv—(tire returning force Tp'—assist torque Tma').

An extremely high reduction gear ratio is typically set in the differential mechanism 11 of the variable gear ratio actuator 7 for such reasons as requirements for smaller motors. Thus, the torque that causes the output-side second shaft 10 to rotate, that is, the motor torque Tmv output from the variable gear ratio actuator 7, is also transmitted to the input-side first shaft 9 on which the motor 12 is arranged. The motor reaction force, which is generated in the input-side first shaft 9, is extremely small compared with the motor torque Tmv. Thus, the torque that causes the steering wheel 2 to rotate in the counter direction is generated in the steering wheel 2. The generated torque increases as the motor torque Tmv increases.

Further, the ACT angle θta is changed by feedback control based on the difference between the ACT command angle θta* and the ACT angle θta. Accordingly, the steered wheels 6 are moved to increase the ACT angle θta faster as the difference between the ACT command angle θta* and the ACT angle θta increases. Thus, the tire returning force Tp' in the opposite direction that hinders the movement of the steered wheels 6 is also increased.

The required motor torque Tmv increases as the IFS_ACT command angle θifs**, which is a control target element of the ACT angle θta during OS control, increases. As a result, the driver feels a stronger torque that causes the steering wheel 2 to rotate in the counter direction.

With respect to this point, the second ECU 18 in the preferred embodiment controls the EPS actuator 17 so that the assist force applied to the steering system, or the assist torque Tma' applied in the direction that counteracts the tire returning force Tp', increases as the ACT angle θta is changed faster when the steering characteristic is oversteer.

More specifically, the OS IFS torque compensation gain calculation unit 85 calculates a larger IFS torque compensation gain Kifs_os during OS control for a larger input IFS_ACT command angle θifs**. When the steering characteristic is oversteer, the OS IFS torque compensation gain calculation unit 85 outputs, as the IFS torque compensation gain Kifs, the IFS torque compensation gain Kifs_os' during OS control, which is based on the IFS torque compensation gain Kifs_os during OS control.

Figure 14:
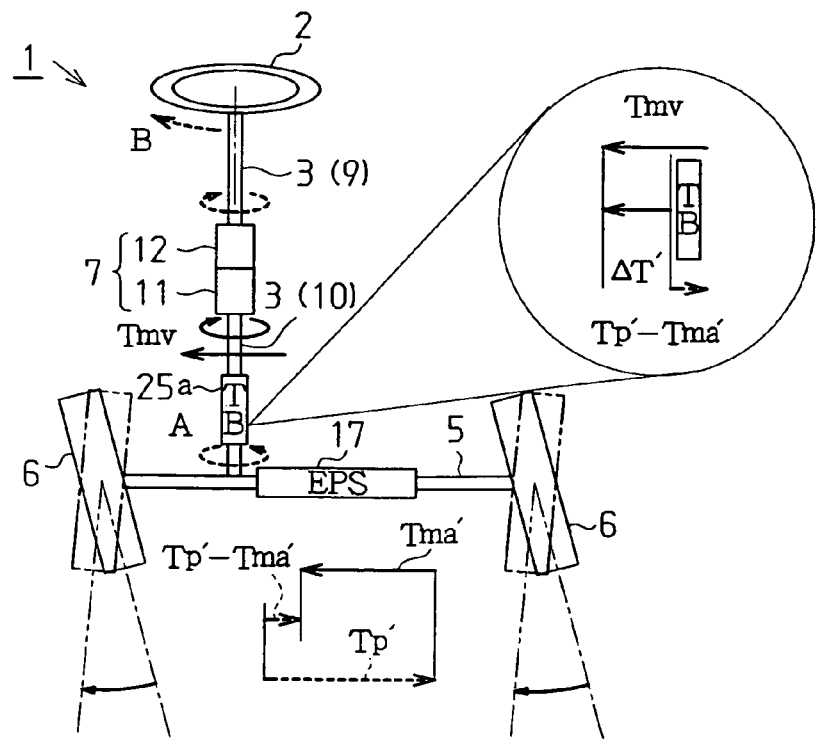
FIG. 14 is an explanatory diagram showing the effects of IFS torque compensation control in the steering apparatus of FIG. 1.

As shown in FIG. 14, during OS control, the applied assist torque Tma' is increased as the IFS_ACT command angle θifs** increases, that is, as the ACT angle θta is changed faster. Thus, the torque that hinders the actuation of the variable gear ratio actuator 7, or "tire returning force Tp'—assist torque Tma'", is decreased.

This improves responsiveness of the variable gear ratio actuator 7 and enables the ACT angle eta to be changed with a smaller motor torque Tmv. As a result, the torque that causes the steering wheel 2 to rotate in the counter direction during OS control is decreased. This improves the steering feel.

Further, when the steering operation performed by the driver is in the same direction as the counter direction, the IFS counter correction gain calculation unit 86 calculates the IFS counter correction gain Kifs_cs that decreases the IFS torque compensation gain Kifs_os during OS control as the operation amount of the steering operation increases. When the steering operation performed by the driver is in the direction opposite to the counter direction, the IFS counter correction gain calculation unit 86 calculates the IFS counter correction gain Kifs_cs that increases the IFS torque compensation gain Kifs_os during OS control as the operation amount of the steering operation increases.

Thus, when the steering operation performed by the driver is in the direction opposite to the counter direction during OS control, the assist force applied to the steering system increases as the operation amount of the steering operation increases. This reduces the load of the variable gear ratio actuator 7 and improves responsiveness of the variable gear ratio actuator 7. Thus, the Act angle θta in the counter direction is readily increased.

When the steering operation performed by the driver is in the same direction as the counter direction, the assist force applied to the steering system decreases as the operation amount of the steering operation increases. Thus, the steered wheel is prevented from being oriented to an excessively large steering angle in the counter direction by the steering operation.

[During US Control]

The operation of the steering apparatus 1 during US control will now be described.

The steering characteristic becomes understeer when the steered wheels 6 are oriented at a steering angle exceeding its grip limit. Thus, when the steering characteristic is understeer, the tire returning force normally decreases so that the driver feels that the steering wheel is light.

However, when the variable gear ratio actuator 7 is actuated to generate the ACT angle θta that reduces the steering angle of the steered wheels 6 by executing US control, the torque that causes the steering wheel 2 to rotate in the counter direction is generated in the same manner as when OS control described above is executed. The generated torque in the counter direction counteracts the decrease of the tire returning force. In this case, the driver is less likely to feel that the steering wheel 2 becomes light.

With respect to this point, the second ECU 18 in the preferred embodiment controls the EPS actuator 17 to increase or decrease the assist force applied to the steering system when the steering characteristic is understeer.

More specifically, for a predetermined time from the start of the US control, the US IFS torque compensation gain calculation unit 87 calculates a larger IFS torque compensation gain Kifs_us during US control for a larger variable gear ratio gain during US control, which determines the control amount of the US control. After the predetermined time elapses, the US IFS torque compensation gain calculation unit 87 calculates a smaller IFS torque compensation gain Kifs_us during US control for a larger control amount of the US control. The US IFS torque compensation gain calculation unit 87 outputs the IFS torque compensation gain Kifs_us during US control as the IFS torque compensation gain Kifs.

During US control, for a predetermined time from the start of the US control, the assist force applied to the steering system increases as the control amount of the US control increases. This reduces the load of the variable gear ratio actuator 7 and improves responsiveness of the variable gear ratio actuator 7. Thus, the understeer state can be readily corrected. Further, the driver is enabled to feel that the steering wheel 2 becomes light, like when the US control is not executed. After the predetermined time elapses, the assist force applied to the steering system decreases as the control amount of the US control increases. This enables highly rigid steering, which is realized when the steering characteristic is neutral, to also be realized when the steering characteristic is understeer.

The preferred embodiment has the advantages described below.

(1) The microcomputer 73 includes the IFS torque compensation control unit 79 that calculates the IFS torque compensation gain Kifs for improving steering feel during IFS control. The IFS torque compensation control unit 79 includes the OS IFS torque compensation gain calculation unit 85. The OS IFS torque compensation gain calculation unit 85 calculates a greater IFS torque compensation gain Kifs_os during OS control for a greater IFS_ACT command angle θifs**, which is a control target element during OS control. When the steering characteristic is oversteer, the IFS torque compensation control unit 79 outputs, as the IFS torque compensation gain Kifs, the IFS torque compensation gain Kifs_os' during OS control, which is based on the IFS torque compensation gain Kifs_os during OS control.

With this structure, the applied assist torque Tma' increases as the ACT angle θta changes faster. This reduces the load of the variable gear ratio actuator 7 and improves responsiveness of the variable gear ratio actuator 7. Further, this enables the ACT angle θta to be changed with a smaller motor torque Tmv. As a result, the torque that causes the steering wheel 2 to rotate in the counter direction during OS control is reduced. This reduces the difference between the expected steering and actual steering and improves the steering feel.

(2) The IFS torque compensation control unit 79 includes the IFS counter correction gain calculation unit 86. When the steering operation performed by the driver is in the direction opposite to the counter direction, the IFS counter correction gain calculation unit 86 calculates the IFS counter correction gain Kifs_cs that increases the IFS torque compensation gain Kifs_os during OS control as the operation amount of the steering operation increases.

With this structure, during OS control, the assist force applied to the steering system increases as the operation amount of the steering operation increases when the steering operation performed by the driver is in the direction opposite to the counter direction. This reduces the load of the variable gear ratio actuator 7 and improves the responsiveness of the variable gear ratio actuator 7. Thus, the ACT angle θta in the counter direction is readily increased.

(3) When the steering operation performed by the driver is in the same direction as the counter direction, the IFS counter correction gain calculation unit 86 calculates the IFS counter correction gain Kifs_cs that decreases the IFS torque compensation gain Kifs_os during OS control as the operation amount of the steering operation increases.

With this structure, during OS control, the assist force applied to the steering system decreases as the operation amount of the steering operation increases when the steering operation performed by the driver is in the same direction as the counter direction. Thus, each steered wheel is prevented from being oriented at an excessively large steering angle in the counter direction by the steering operation.

(4) The IFS torque compensation control unit 79 includes the US IFS torque compensation gain calculation unit 87. For a predetermined time from the start of the US control, the US IFS torque compensation gain calculation unit 87 calculates a larger IFS torque compensation gain Kifs_us during US control for a larger variable gear ratio gain during US control, which determines the control amount of the US control. The IFS torque compensation control unit 79 outputs the IFS torque compensation gain Kifs_us during US control as the IFS torque compensation gain Kifs when the steering characteristic is understeer.

With this structure, during US control, the assist force applied to the steering system increases as the control amount of the control increases for the predetermined time from the start of the US control. This reduces the load of the variable gear ratio actuator 7 and improves responsiveness of the variable gear ratio actuator 7. Thus, the understeer state is readily corrected. Further, the driver is enabled to feel that the steering wheel 2 becomes light like when the US control is not executed. As a result, the driver is notified that the vehicle is in an understeer state.

(5) After the predetermined time elapses from the start of the US control, the US IFS torque compensation gain calculation unit 87 calculates a smaller IFS torque compensation gain Kifs_us during US control for a larger variable gear ratio gain during US control. With this structure, after the predetermined time elapses, the assist force applied to the steering system decreases as the control amount of the US control increases. This enables highly rigid steering, which is realized when the steering characteristic is neutral, to be also realized when the steering characteristic is understeer.

It should be apparent to those skilled in the art that the present invention may be embodied in many other specific forms without departing from the spirit or scope of the invention. Particularly, it should be understood that the present invention may be embodied in the following forms.

Figure 15:
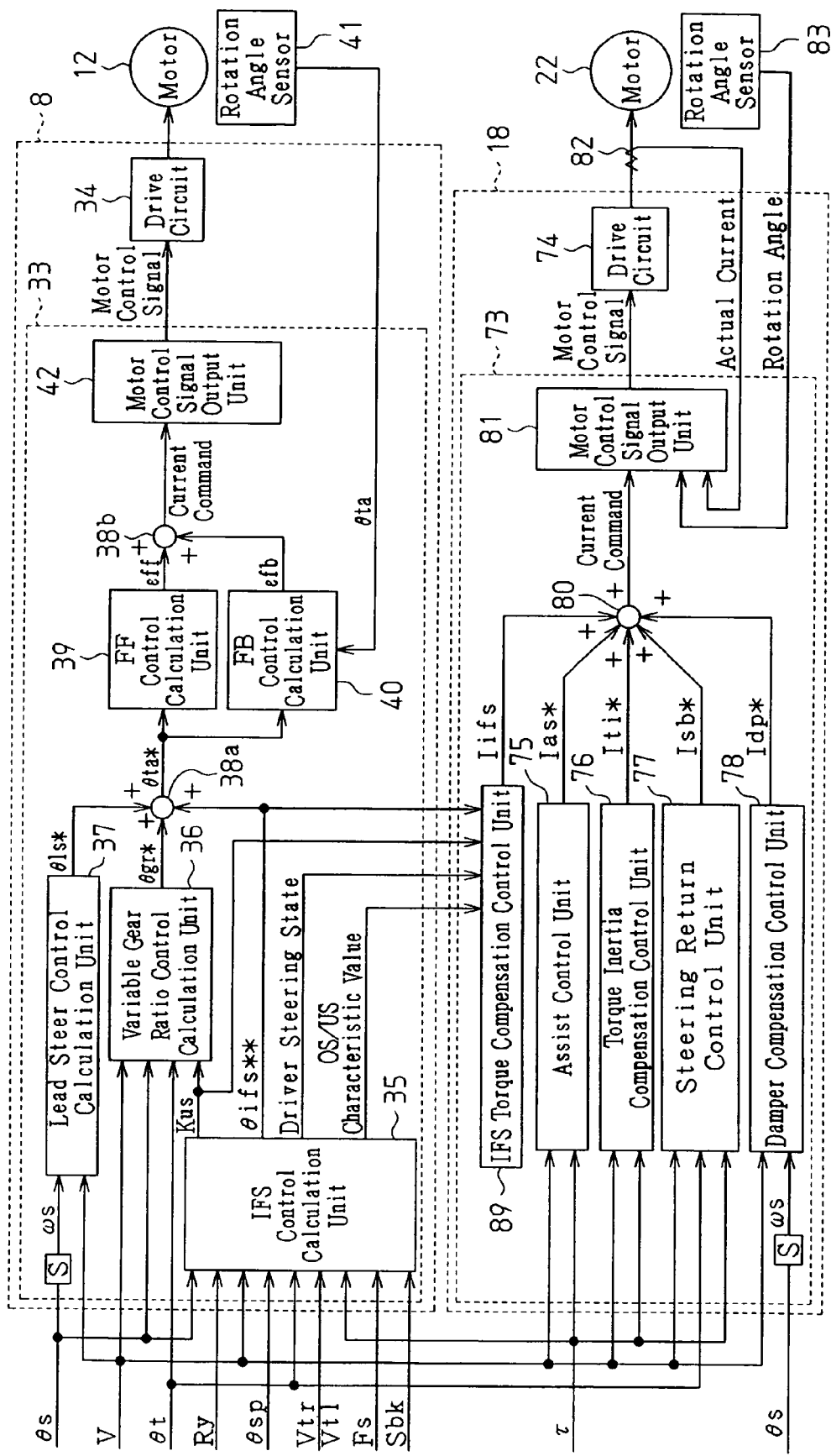
FIG. 15 is a control block diagram of a steering apparatus according to another example of the present invention.

In the preferred embodiment, the IFS torque compensation control unit 79 outputs the IFS torque compensation gain Kifs that corrects the basic assist current command Ias*. However, the present invention should not be limited to such a structure. As shown in FIG. 15, an IFS torque compensation control unit 89 may output an IFS torque compensation current command Iifs* as a control target element for compensating the assist torque during IFS control, and the IFS torque compensation current command Iifs* may be superimposed on the other control target elements.

Figure 16:
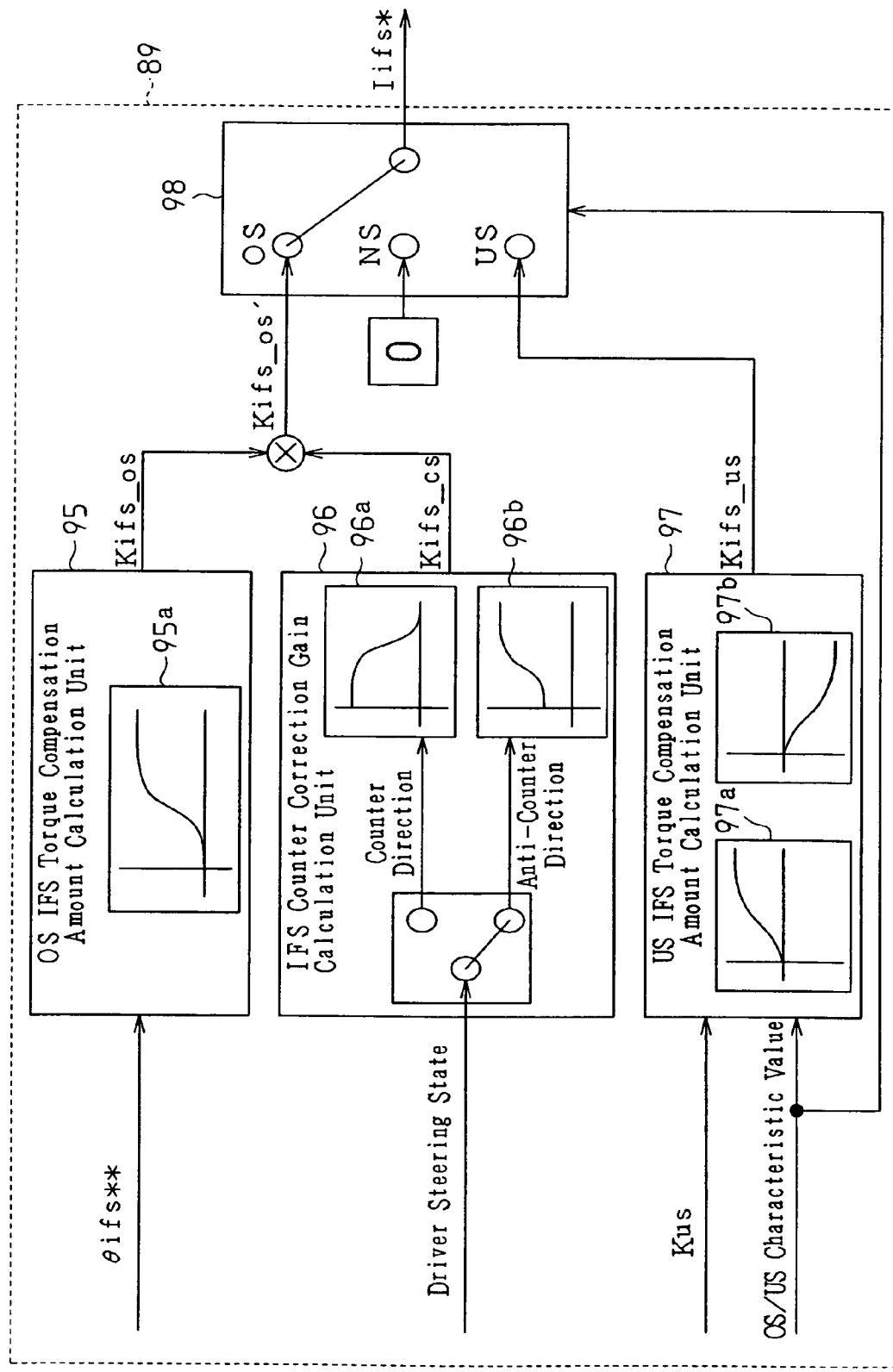
FIG. 16 is a control block diagram of an IFS torque compensation control unit in the other example of the present invention.

This is embodied by, for example, the structure of the IFS torque compensation control unit 89 shown in FIG. 16. As shown in the drawing, an OS IFS torque compensation amount calculation unit 95 may have a map 95a associating the IFS_ACT command angle θifs** with an IFS torque compensation amount Iifs_os* during OS control. A US IFS torque compensation amount calculation unit 97 may have maps 97a and 97b associating the variable gear ratio gain Kus during US control with an IFS torque compensation amount Iifs_us* during US control. The OS IFS torque compensation amount calculation unit 95 outputs the IFS torque compensation amount Iifs_os* during OS control based on the IFS_ACT command angle θifs. The US IFS torque compensation amount calculation unit 97** outputs the IFS torque compensation amount Iifs_us* during US control based on the variable gear ratio gain Kus during US control.

Further, an IFS counter correction gain calculation unit 96 outputs the IFS counter correction gain Kifs_cs for correcting the IFS torque compensation amount Iifs_os* during OS control. The corrected IFS torque compensation amount Iifs_os** during OS control and the IFS torque compensation amount Iifs_us* during US control are input into an output switch unit 98. The output switch unit 98 outputs, as the IFS torque compensation current command Iifs*, the IFS torque compensation amount Iifs_os** during OS control, the IFS torque compensation amount Iifs_us* during US control, or zero according to the input OS/US characteristic value. With this structure, the same advantages as described in the above embodiment are obtained. In this case, the OS IFS torque compensation amount calculation unit 95 functions as a compensation assist force calculation unit. Further, the maps 96a and 96b need to be changed accordingly. The IFS torque compensation current command Iifs* becomes zero when the steering characteristic is neutral.

In the preferred embodiment, the IFS torque compensation control unit 79 includes the OS IFS torque compensation gain calculation unit 85, the IFS counter correction gain calculation unit 86, and the US IFS torque compensation gain calculation unit 87. However, the present invention should not be limited to such a structure. The IFS counter correction gain calculation unit 86 may be eliminated from the IFS torque compensation control unit 79. Alternatively, the IFS torque compensation control unit 79 may include only one of the OS IFS torque compensation gain calculation unit 85 and the US IFS torque compensation gain calculation unit 87. More specifically, the IFS torque compensation control unit 79 may perform only one of the IFS torque compensation gain calculation during OS control and the IFS torque compensation gain calculation during US control. The IFS torque compensation control unit 79 does not have to perform the IFS counter correction gain calculation, and may use the IFS torque compensation gain Kifs_os during OS control as the IFS torque compensation gain Kifs.

In the preferred embodiment, the IFS control calculation unit 35 inputs, as the control target element of the ACT angle θta during OS control, the IFS_ACT command angle θifs into the OS IFS torque compensation gain calculation unit 85. The OS IFS torque compensation gain calculation unit 85 calculates the IFS torque compensation gain Kifs_os during OS control based on the IFS_ACT command angle θifs. However, the present invention should not be limited to such a structure. The above control target element that is used to calculate the IFS torque compensation gain Kifs_os during OS control may be the velocity of the command angle or the acceleration degree of the command angle. Further, not only the control target element of the ACT angle θta during OS control but also the control target amount of the ACT angle θta, namely, the ACT command angle θta*, or the velocity or acceleration degree of the command angle, or a command current may be used to calculate the IFS torque compensation gain Kifs_os during OS control. Further, the actual velocity or actual acceleration degree of the ACT angle θta, or the current amount of the motor 12 may be used to calculate the IFS torque compensation gain Kifs_os during OS control. At least one of the above parameters or a freely chosen combination of the above parameters may be used to calculate the IFS torque compensation gain Kifs_os during OS control.

In the preferred embodiment, the driver steering state, which is input into the IFS counter correction gain calculation unit 86, may be any control signal indicating the direction of the steering operation performed by the driver and the operation amount of the steering operation. For example, the driver steering state may be any one of or a freely chosen combination of the steering speed ωs and the steering torque τ, or amounts obtained by differentiating the steering speed ωs and the steering torque τ.

In the preferred embodiment, the gain calculation units of the IFS torque compensation control unit 79 use the maps to calculate the IFS torque compensation gain Kifs_os during OS control, the IFS counter correction gain Kifs_cs, and the IFS torque compensation gain Kifs_us during US control. However, the present invention should not be limited to such a structure. The gain calculation units may calculate these gains through any methods other than using the maps.

In the preferred embodiment, the US IFS torque compensation gain calculation unit 87 has the two maps 87a and 87b associating the variable gear ratio gain Kus during US control with the IFS torque compensation gain Kifs_us during US control, and calculates the IFS torque compensation gain Kifs_us during US control by switching these maps 87a and 87b. However, the present invention should not be limited to such a structure. The US IFS torque compensation gain calculation unit 87 may calculate the IFS torque compensation gain Kifs_us during US control using one of the maps 87a and 87b. More specifically, the US IFS torque compensation gain calculation unit 87 may calculate a larger IFS torque compensation gain Kifs_us during US control for a larger input variable gear ratio gain Kus during US control, or may calculate a smaller IFS torque compensation gain Kifs_us for a larger variable gear ratio gain Kus during US control.

In the preferred embodiment, the US IFS torque compensation gain calculation unit 87 calculates a large IFS torque compensation gain Kifs_us during US control for a predetermined time from the start of the US control based on the OS/US characteristic value, and calculates a small IFS torque compensation gain Kifs_us during US control after the predetermined time elapses. However, the present invention should not be limited to such a structure. A control ON/OFF signal may be input into the IFS torque compensation control unit 79, and the US IFS torque compensation gain calculation unit 87 may switch the above IFS torque compensation gains Kifs_us during US control to be calculated, based on the control ON/OFF signal.

Further, the US IFS torque compensation gain calculation unit 87 may calculate the IFS torque compensation gain Kifs_us during US control based on at least one of the above listed control target amounts or substantial values, instead of the variable gear ratio gain Kus during US control.

The present examples and embodiments are to be considered as illustrative and not restrictive, and the invention is not to be limited to the details given herein, but may be modified within the scope and equivalence of the appended claims.

What is claimed is:

1. A vehicle steering apparatus for changing a steering angle of a steered wheel of a vehicle in accordance with operation of a steering wheel, the steering apparatus comprising:
   a steering force assist device including a motor for generating a steering assist force to assist a driver steering input to the steering wheel;
   a variable transmission ratio device including a motor for steering the steered wheel, the steering angle of the steered wheel being determined by superimposing a first steering angle, based on a turning angle of the steering wheel, and a second steering angle, based on drive of the motor of the variable transmission ratio device, in which the variable transmission ratio device adjusts the second steering angle to change the ratio of the steering angle of the steered wheel relative to the turning angle of the steering wheel;
   a determination unit for determining a steering characteristic of the vehicle, wherein when the steering characteristic is oversteer, the variable transmission ratio device changes the second steering angle to move the steered wheel to a steering angle in a direction opposite to the present steering angle of the steered wheel with respect to a straight traveling direction of the vehicle;
   a control unit for controlling the steering force assist device, the control unit including a torque compensation control unit for modifying the assist force applied by the steering force assist device to counteract a returning force generated at the steered wheel due to the change in the second steering angle when the steering characteristic is oversteer, wherein the torque compensation control unit increases the modification of the assist force as the speed at which the second steering angle changes increases.

2. The steering apparatus according to claim 1, wherein the torque compensation control unit includes a compensation gain calculation unit for calculating a compensation gain to compensate the assist force when the steering characteristic is oversteer, the compensation gain calculation unit calculating the compensation gain based on at least one of a control target amount of the second steering angle, an actual angular velocity of the vehicle, an actual angular acceleration of the vehicle, and a current amount of the motor of the variable transmission ratio device.

3. The steering apparatus according to claim 2, further comprising:
   a steering state determination unit for determining an operation direction and an operation amount of the steering wheel;
   wherein the compensation gain calculation unit increases the compensation gain as the operation amount of the steering wheel increases when the operation direction of the steering wheel is opposite to the changing direction of the second steering angle.

4. The steering apparatus according to claim 2, further comprising:
   a steering state determination unit for determining an operation direction and an operation amount of the steering wheel;
   wherein the compensation gain calculation unit decreases the compensation gain as the operation amount of the steering wheel increases when the operation direction of the steering wheel is the same as the changing direction of the second steering angle.

5. The steering apparatus according to claim 1, wherein the torque compensation control unit includes a compensation assist force calculation unit for calculating a compensation assist force to compensate the assist force when the steering characteristic is oversteer, the compensation assist force calculation unit calculating the compensation assist force based on at least one of a control target amount of the second steering angle, an actual angular velocity of the vehicle, an actual angular acceleration of the vehicle, and a current amount of the motor of the variable transmission ratio device.

6. The steering apparatus according to claim 5, further comprising:
   a steering state determination unit for determining an operation direction and an operation amount of the steering wheel;
   wherein the torque compensation control unit includes a correction gain calculation unit for calculating a correction gain for correcting the compensation assist force, the correction gain calculation unit calculating the correction gain so that the compensation assist force increases as the operation amount of the steering wheel increases when the operation direction of the steering wheel is opposite to the changing direction of the second steering angle.

7. The steering apparatus according to claim 5, further comprising:
   a steering state determination unit for determining an operation direction and an operation amount of the steering wheel;
   wherein the torque compensation control unit includes a correction gain calculation unit for calculating a correction gain for correcting the compensation assist force, the correction gain calculation unit calculating the correction gain so that the compensation assist force decreases as the operation amount of the steering wheel increases when the operation direction of the steering wheel is the same as the changing direction of the second steering angle.

8. The steering apparatus according to claim 1, further comprising:
   a steering state determination unit for determining an operation direction and an operation amount of the steering wheel;
   wherein the control unit increases the assist force as the operation amount of the steering wheel increases when the operation direction of the steering wheel is opposite to the changing direction of the second steering angle.

9. The steering apparatus according to claim 1, further comprising:
   a steering state determination unit for determining an operation direction and an operation amount of the steering wheel;

wherein the control unit decreases the assist force as the operation amount of the steering wheel increases when the operation direction of the steering wheel is the same as the changing direction of the second steering angle.

10. A vehicle steering apparatus for changing a steering angle of a steered wheel of a vehicle in accordance with operation of a steering wheel, the steering apparatus comprising:
a steering force assist device including a motor for generating a steering assist force to assist a driver steering input to the steering wheel;
a variable transmission ratio device including a motor for steering the steered wheel, the steering angle of the steered wheel being determined by superimposing a first steering angle, based on a turning angle of the steering wheel, and a second steering angle, based on drive of the motor of the variable transmission ratio device, in which the variable transmission ratio device adjusts the second steering angle based on an input control amount to change the ratio of the steering angle of the steered wheel relative to the turning angle of the steering wheel;
a determination unit for determining a steering characteristic of the vehicle, wherein when the steering characteristic is understeer, the variable transmission ratio device changes the second steering angle to decrease the steering angle of the steered wheel;
a control unit for controlling the steering force assist device, the control unit including a torque compensation control unit for modifying the assist force applied by the steering force assist device to counteract a returning force generated at the steered wheel due to the change in the second steering angle when the steering characteristic is understeer, wherein the torque compensation control unit increases the modification of the assist force as the speed at which the second steering angle changes increases.

11. A vehicle steering apparatus for changing a steering angle of a steered wheel of a vehicle in accordance with operation of a steering wheel, the steering apparatus comprising:
a steering force assist device including a motor for generating a steering assist force to assist a driver steering input to the steering wheel;
a variable transmission ratio device including a motor for steering the steered wheel, the steering angle of the steered wheel being determined by superimposing a first steering angle, based on a turning angle of the steering wheel, and a second steering angle, based on drive of the motor of the variable transmission ratio device, in which the variable transmission ratio device adjusts the second steering angle based on an input control amount to change the ratio of the steering angle of the steered wheel relative to the turning angle of the steering wheel;
a determination unit for determining a steering characteristic of the vehicle, wherein when the steering characteristic is understeer, the variable transmission ratio device changes the second steering angle to decrease the steering angle of the steered wheel;
a control unit for controlling the steering force assist device, the control unit including a torque compensation control unit for modifying the assist force applied by the steering force assist device to counteract a returning force generated at the steered wheel due to the change in the second steering angle when the steering characteristic is understeer, wherein the torque compensation control unit decreases the modification of the assist force as the speed at which the second steering angle changes increases.

12. A vehicle steering apparatus for changing a steering angle of a steered wheel of a vehicle in accordance with operation of a steering wheel, the steering apparatus comprising:
a steering force assist device including a motor for generating a steering assist force to assist a driver steering input to the steering wheel;
a variable transmission ratio device including a motor for steering the steered wheel, the steering angle of the steered wheel being determined by superimposing a first steering angle, based on a turning angle of the steering wheel, and a second steering angle, based on drive of the motor of the variable transmission ratio device, in which the variable transmission ratio device adjusts the second steering angle based on an input control amount to change the ratio of the steering angle of the steered wheel relative to the turning angle of the steering wheel;
a determination unit for determining a steering characteristic of the vehicle, wherein when the steering characteristic is understeer, the variable transmission ratio device changes the second steering angle to decrease the steering angle of the steered wheel;
a steering force assist device for generating an assist force in a direction counteracting a returning force, which acts on the steered wheel and is produced when the steering angle of the steered wheel changes, to assist the operation of the steering wheel; and
a control unit for controlling the steering force assist device, the control unit including a torque compensation control unit for modifying the assist force applied by the steering force assist device to counteract a returning force generated at the steered wheel due to the change in the second steering angle when the steering characteristic is understeer, the control unit increasing the assist force as the control amount increases until a predetermined time elapses from when the second steering angle starts to change, and the control unit decreasing the assist force as the control amount increases after the predetermined time elapses.

* * * * *